United States Patent
Johnson et al.

(10) Patent No.: US 8,851,060 B2
(45) Date of Patent: Oct. 7, 2014

(54) BARBECUE COOKING APPARATUS WITH FOLDING SHELVES

(75) Inventors: Mark Johnson, Cary, IL (US); Adrian A. Bruno, Rolling Meadows, IL (US); Robert DeMars, Woodland Hills, CA (US)

(73) Assignee: Weber-Stephen Products Co., Palatine, IL (US)

( * ) Notice: Subject to any disclaimer, the term of this patent is extended or adjusted under 35 U.S.C. 154(b) by 1156 days.

(21) Appl. No.: 12/283,481

(22) Filed: Sep. 12, 2008

(65) Prior Publication Data

US 2009/0095277 A1    Apr. 16, 2009

Related U.S. Application Data

(63) Continuation of application No. 11/224,837, filed on Sep. 14, 2005, now Pat. No. 7,438,071, which is a continuation of application No. 11/098,721, filed on Apr. 4, 2005, now Pat. No. 6,976,485, which is a continuation of application No. 10/319,421, filed on Dec. 13, 2002, now Pat. No. 6,910,476, application No. 12/283,481, which is a continuation of application No. 10/444,237, filed on May 27, 2003, now Pat. No. 6,981,497, which is a continuation-in-part of application No. 09/736,847, filed on Dec. 13, 2000, now Pat. No. 6,606,987.

(51) Int. Cl.
*A47J 37/00* (2006.01)
*A47J 37/07* (2006.01)

(52) U.S. Cl.
CPC ......... *A47J 37/0704* (2013.01); *A47J 37/0713* (2013.01); *A47J 37/0786* (2013.01); *A47J 37/0763* (2013.01); *A47J 2037/0777* (2013.01)
USPC .............. 126/9 B; 126/39 B; 126/50; 126/30; 126/25 R

(58) Field of Classification Search
USPC ................. 126/39 B, 50, 41 R, 40, 39 R, 9 B
See application file for complete search history.

(56) References Cited

U.S. PATENT DOCUMENTS

| | | |
|---|---|---|
| 948,717 A | 2/1910 | Avery |
| 1,139,212 A | 5/1915 | Morgan |
| 1,302,911 A | 5/1919 | Gilbert |
| 1,438,345 A | 12/1922 | Tait et al. |
| 1,478,371 A | 12/1923 | Albrighton |
| 1,483,159 A | 2/1924 | Coleman |
| 1,531,405 A | 3/1925 | Lehman |
| 1,654,330 A | 12/1927 | Jenkins |

(Continued)

FOREIGN PATENT DOCUMENTS

| | | |
|---|---|---|
| JP | 11-076070 | 3/1999 |
| WO | WO 02/069866 | 9/2002 |

*Primary Examiner* — Alfred Basichas
(74) *Attorney, Agent, or Firm* — David I. Roche; Baker & McKenzie LLP

(57) ABSTRACT

A portable barbecue cooking apparatus is provided, the apparatus comprising a cooking chamber comprising a topside opening and a fire bowl with opposing ends; at least two handles, each handle attached to opposing ends of the fire bowl; and at least two shelves, each shelf being pivotally attached to each of the handles, and each shelf being foldable inwardly towards the topside opening of the cooking chamber during a stowage position and extendable outwardly away from the topside opening of the cooking chamber during a usage position.

28 Claims, 18 Drawing Sheets

(56) References Cited

U.S. PATENT DOCUMENTS

| | | |
|---|---|---|
| D91,639 S | 2/1934 | Stulik |
| 1,952,776 A | 3/1934 | Quinlin |
| 2,021,915 A | 11/1935 | Hancock et al. |
| 2,154,305 A | 4/1939 | Goerl |
| 2,246,440 A | 6/1941 | Hester |
| 2,484,239 A | 10/1949 | Moon et al. |
| 2,559,710 A | 7/1951 | Danielsen |
| 2,742,892 A | 4/1956 | Herzer |
| 2,791,959 A | 5/1957 | Pirz |
| 2,985,164 A | 5/1961 | Imoto |
| 3,005,451 A | 10/1961 | Richart |
| 3,094,113 A | 6/1963 | Avila |
| 3,330,266 A | 7/1967 | Stephen |
| 3,459,171 A | 8/1969 | Swanson |
| 3,611,912 A | 10/1971 | Choe |
| 3,665,913 A | 5/1972 | Cagle, Jr. |
| D229,660 S | 12/1973 | Gammon |
| 3,791,368 A | 2/1974 | Hunt et al. |
| 3,791,370 A | 2/1974 | Fauser |
| 3,915,529 A | 10/1975 | Bernier |
| D251,893 S | 5/1979 | Chan |
| 4,170,173 A | 10/1979 | Bradford |
| D285,522 S | 9/1986 | Basini |
| 4,616,624 A | 10/1986 | Parker |
| 4,677,964 A | 7/1987 | Lohmeyer et al. |
| D291,399 S | 8/1987 | Chan |
| 5,076,256 A | 12/1991 | Raymer et al. |
| 5,090,398 A | 2/1992 | Raymer et al. |
| D325,318 S | 4/1992 | Parent et al. |
| 5,109,834 A | 5/1992 | Collins et al. |
| 5,165,385 A | 11/1992 | Doolittle |
| 5,293,859 A | 3/1994 | Lisker |
| 5,359,988 A | 11/1994 | Hait |
| 5,452,707 A | 9/1995 | Harris et al. |
| 5,471,916 A | 12/1995 | Bird et al. |
| 5,617,779 A | 4/1997 | Dutczak |
| 5,832,915 A | 11/1998 | Skidmore et al. |
| 5,873,355 A | 2/1999 | Schlosser et al. |
| 5,941,229 A | 8/1999 | Schlosser et al. |
| 5,960,788 A | 10/1999 | Bach et al. |
| 5,970,971 A | 10/1999 | Wu |
| 6,131,562 A | 10/2000 | Schlosser et al. |
| 6,142,140 A | 11/2000 | Shumaker |
| 6,254,160 B1 | 7/2001 | Marriott et al. |
| 6,302,097 B1 | 10/2001 | Rivera |
| 6,308,616 B1 | 10/2001 | Johnson |
| D450,524 S | 11/2001 | Measom |
| D457,030 S | 5/2002 | DeMars |
| D457,776 S | 5/2002 | DeMars |
| D458,506 S | 6/2002 | DeMars |
| 6,439,220 B1 | 8/2002 | Johnson |
| 6,513,515 B1 | 2/2003 | Wu |
| 6,606,987 B2 | 8/2003 | DeMars |
| 6,792,935 B2 | 9/2004 | Williams et al. |
| 6,910,475 B2 | 6/2005 | Zelek et al. |
| 6,951,213 B2 | 10/2005 | Coleman et al. |
| 7,438,071 B2 * | 10/2008 | Johnson et al. ............ 126/25 R |

* cited by examiner

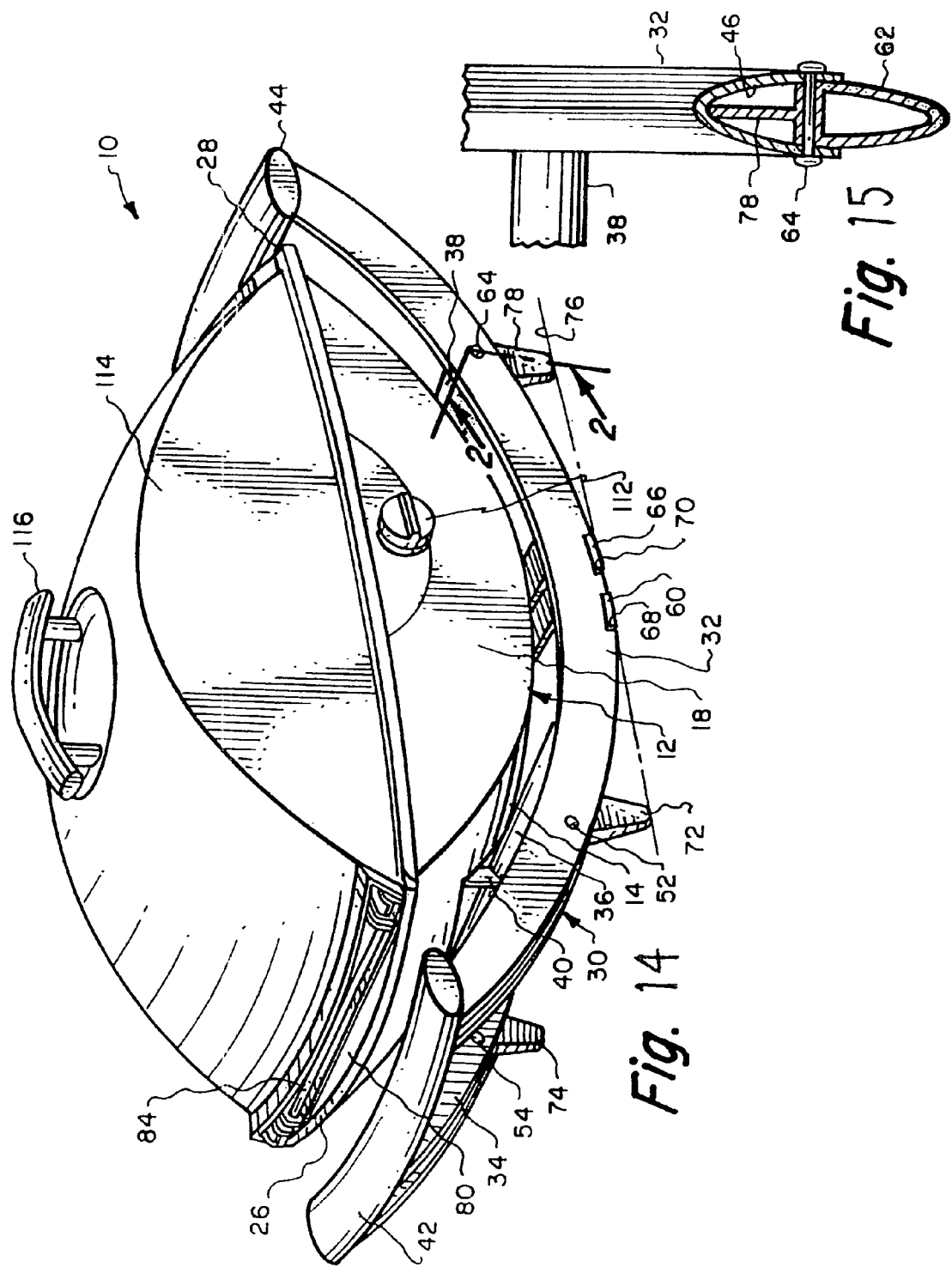

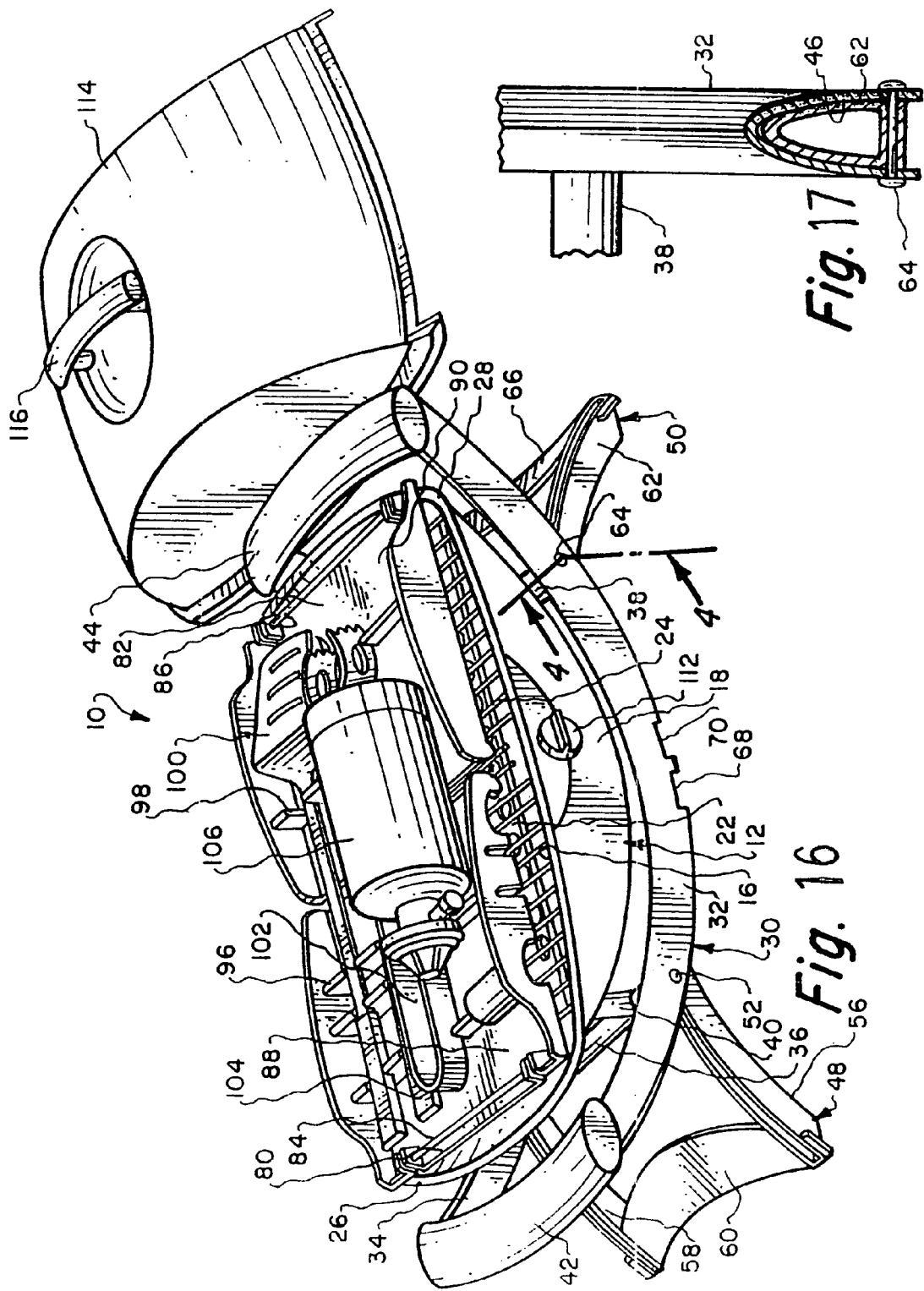

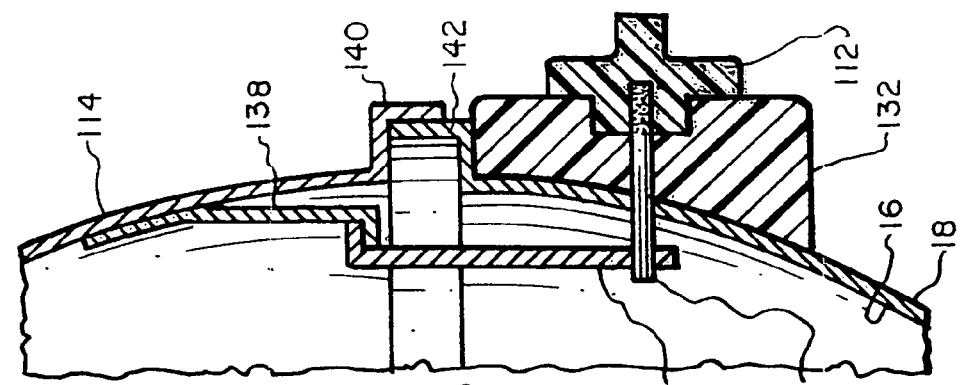
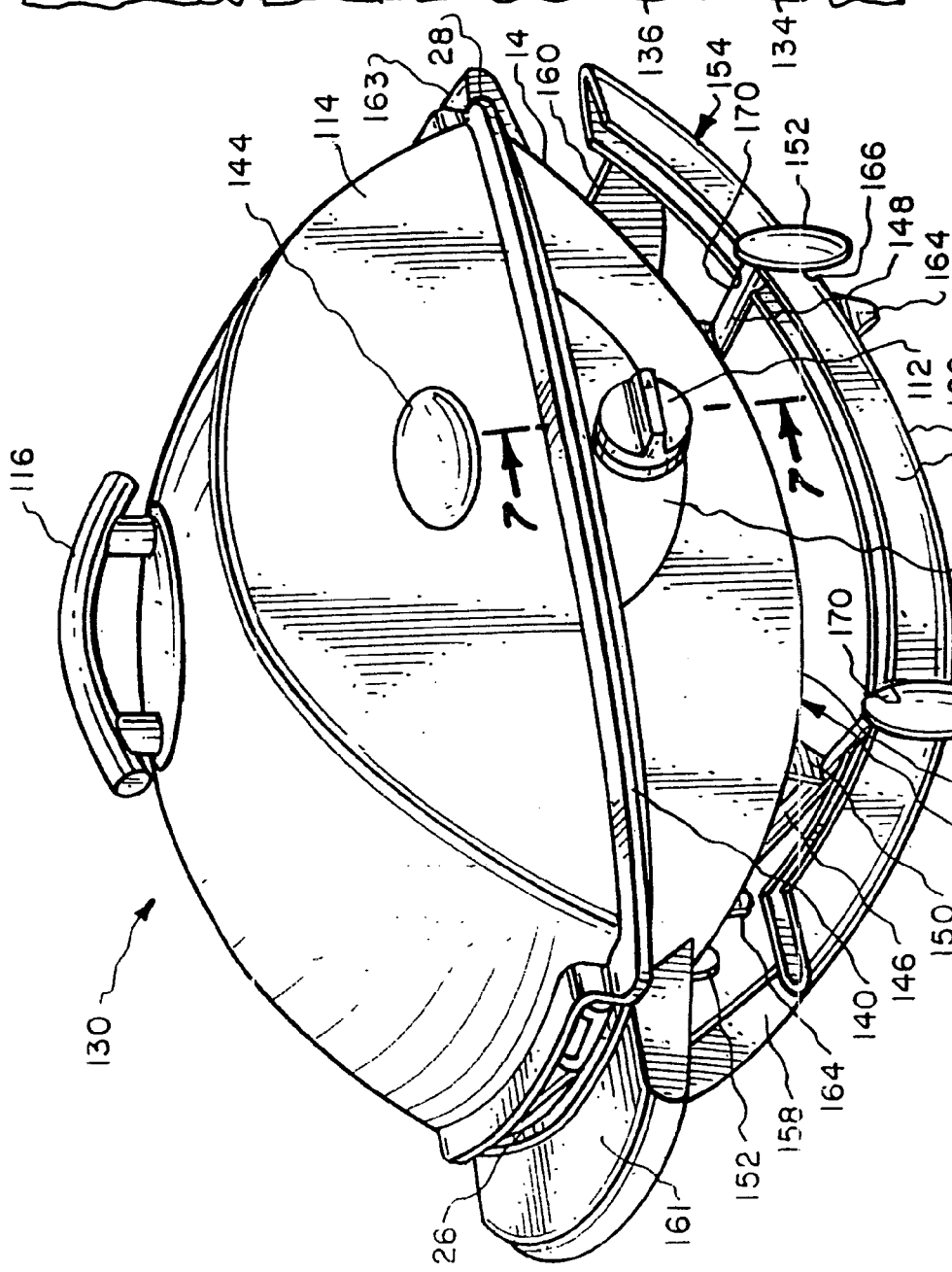

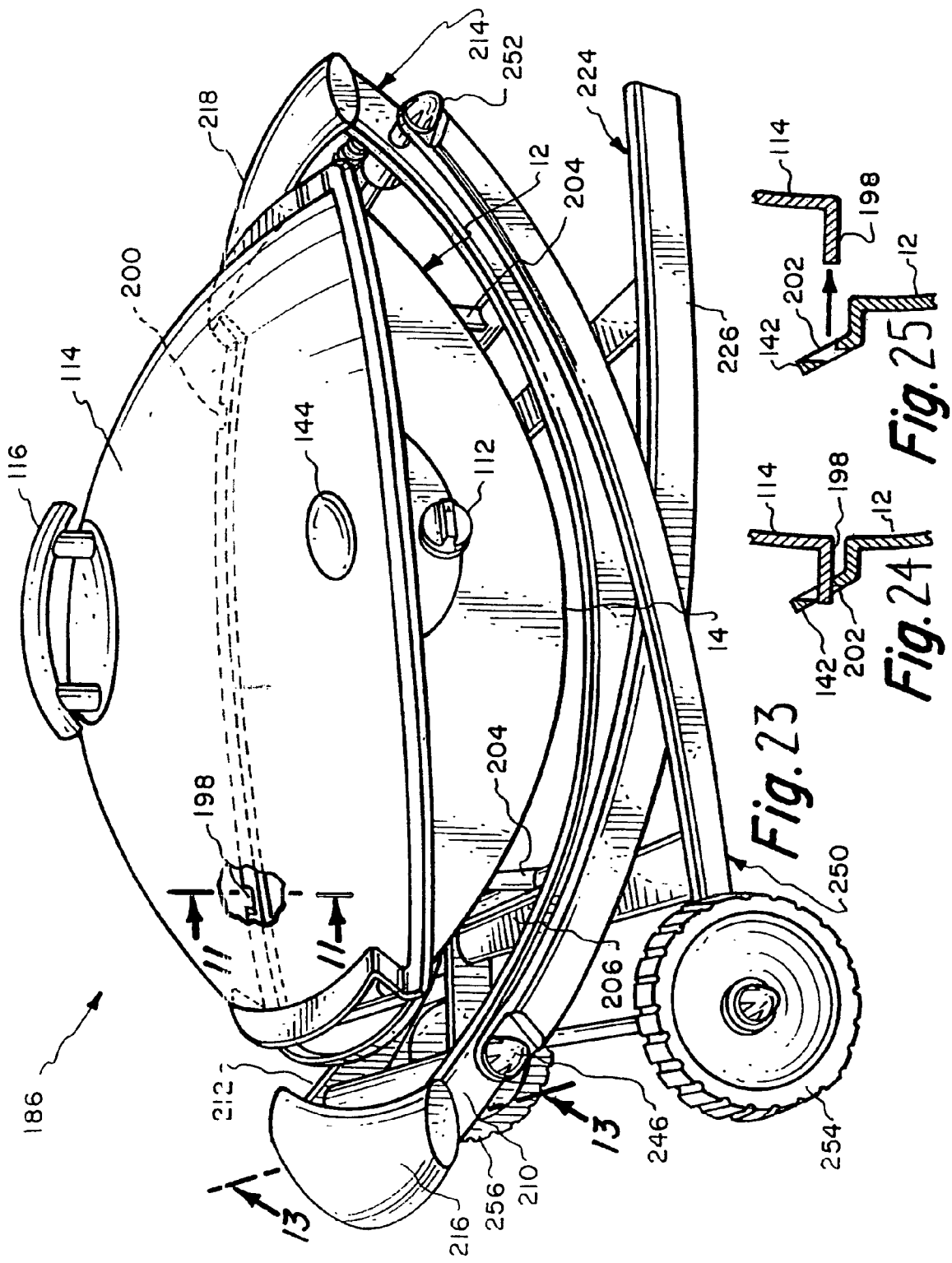

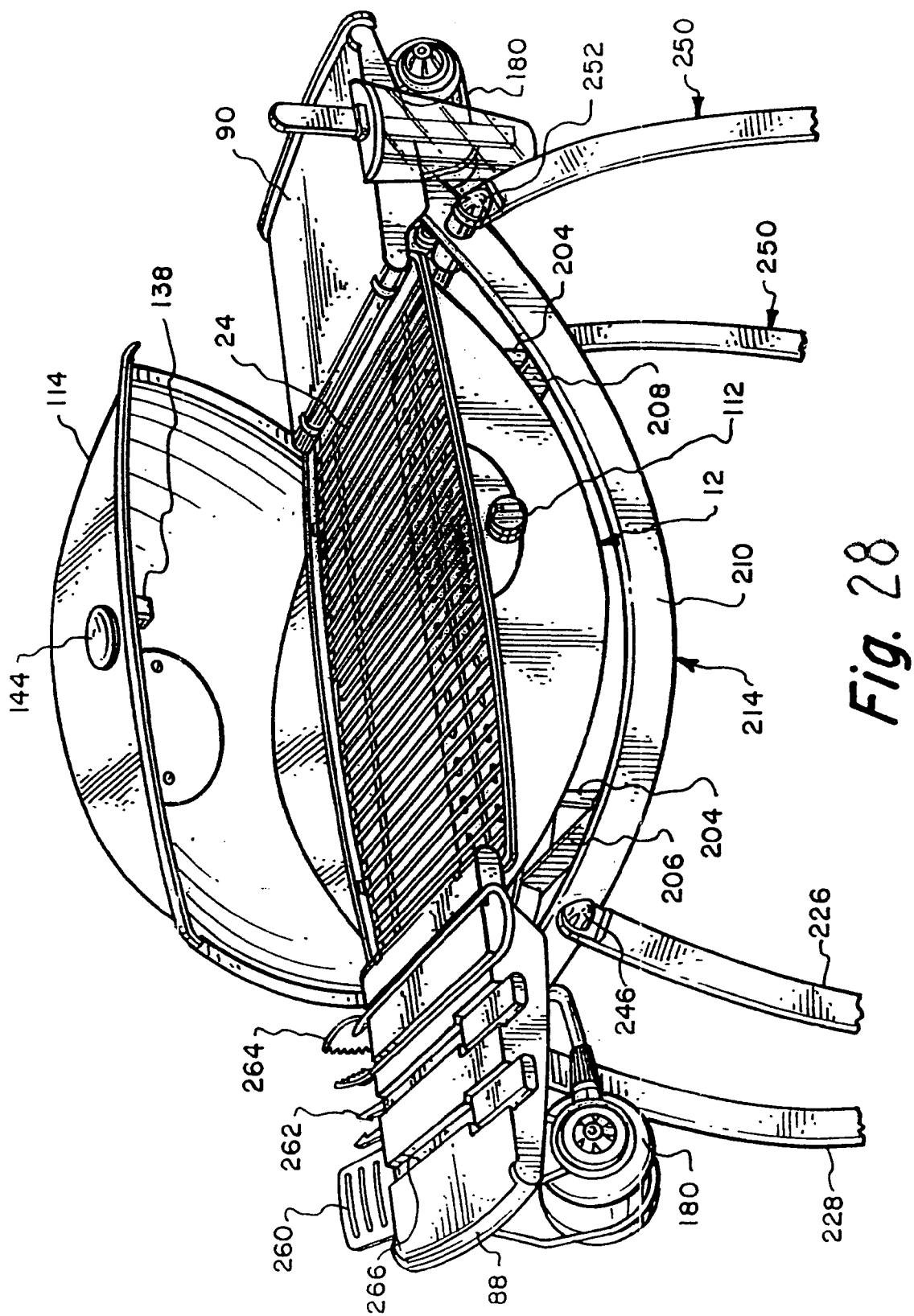

BARBECUE COOKING APPARATUS WITH FOLDING SHELVES

RELATED APPLICATION

This application is a continuation application of U. S. application Ser. No. 11/224,837, entitled "Barbecue Grill With Folding Shelf" which was filed on Sep. 14, 2005 and has now been granted a Notice of Allowance; and which is a continuation application of U. S. application Ser. No. 11/098, 721, entitled "Barbecue Grill and Support Frame Assembly" which was filed on Apr. 4, 2005 and issued as U.S. Pat. No. 6,910,476; which is a continuation application of U. S. application Ser. No. 10/319,421, entitled "Barbecue Grill and Support Frame Assembly" which was filed on Feb. 13, 2002 and issued as U.S. Pat. No. 6,910,476; and this application is also a continuation application of U.S. application Ser. No. 10/444,237, entitled "Portable Cooking Apparatus" which was filed on May 27, 2003 and issued as U.S. Pat. No. 6,981, 497; which is a continuation-in-part of U.S. application Ser. No. 09/736,847, entitled "Cooking Apparatus" which was filed on Dec. 13, 2000 and issued as U.S. Pat. No. 6,606,987.

BACKGROUND OF THE INVENTION

1. Field of the Invention

This invention relates to a barbecue cooking apparatus and more particularly, to a compact portable barbecue grill with foldable shelves for cooking food.

2. Description of the Related Art

Fixed outdoor fireplaces or barbecues have been known for many years. Typically, these fireplaces or barbecues are constructed of brick, masonry and/or metal. In recent years, portable outdoor fireplaces or barbecues have entered the marketplace. Such portable barbecues are compact and are readily movable from one location to another such as a beach or park, and readily transportable within a vehicle, such as an automobile.

Barbecue grills have grown in popularity in recent years. There are two primary types of barbecue grills commonly used: gas grills and solid fuel grills. Gas barbecue grills employ a gas burner or group of burners to cook food that is supported on a grate above the burner(s). The fuel source for gas barbecue grills is typically liquid propane or natural gas. Solid fuel barbecue grills use combustible solid fuel, typically charcoal, to cook the food. As a result, this type of grill is commonly referred to as a charcoal barbecue grill. Regardless of the type, the barbecue grill has a cooking chamber that includes a cover and a firebox. By movement of the cover, the cooking chamber is movable between an open position and a closed position. The cooking chamber may be in the closed position when the food is being cooked by the barbecue grill. Preferably, the cover is in the closed position when the grill is not in use, and instead is stored between uses.

During operation of the barbecue grill, food is placed on the grate for cooking, which results in grease and such byproducts from the food being released during cooking. The quantity of grease generated during the cooking process varies with a number of factors, including but not limited to the type of food cooked, the amount of food cooked, the amount of heat generated by the heat source such as a burner tube, and the ambient conditions. Over time and repeated use, grease and byproducts can accumulate within the cooking chamber. The accumulation of grease and byproducts can negatively affect the performance and operation of the barbecue grill assembly. For this reason, some barbecue grills incorporate an opening in the bottom of the lower portion of the cooking chamber for passage and collection of grease and/or debris.

Another aspect of conventional barbecue grills is to provide a frame or support structure to hold the cooking chamber in suitable location for use. Also, some commonly used grills include side work shelves, to provide area for resting food and utensils when using the grill. The support frame structures often serve as support for the side shelves, and sometimes provide for collapsible shelves. In typical grill assemblies, the collapsible side shelves typically drop to a storage position toward the frame structure, usually into a generally vertical non-use position.

One example of such a common gas barbecue grill is shown in U.S. Pat. No. 4,677,964 to Lohmeyer et al. In FIG. 4, the cooking chamber 52 comprises the cover 58 and the firebox 56. A burner element 62 is positioned in a lower region of the firebox 56 and a grate 66 is positioned in an upper region of the firebox 56. A drip pan 98 collects grease and byproducts that pass through the drain opening in the lower portion of the firebox 56. The cover 58 is movably supported by a hinge 60 positioned at the rear of the cooking chamber 52. A rim defines a perimeter of the firebox 56. In the closed position of FIG. 4, the rim engages the angled front wall of the cover 58. The grill assembly also has a portable cart 22 that supports the lower housing 52 of the grill, as it is suspended on the side members 40 of the cart 22. The grill assembly further provides a working surface, such as a working board 170 supported on the side members of the cart 22, adjacent the cooking vessel 24. In a collapsible arrangement of the working board 172, the board is connected to the cart 22 by a hinge, and is supported by a rod 174.

Despite the popularity of grills with supporting cart or frame assemblies in use, there is a need for a barbecue grill and frame structure with compact arrangement and versatility of side shelves that pivot on the frame into the cooking chamber for storage of the grill. Further, there is a need for a grill and support frame structure that supports a heat shield and grease/debris collection chamber and serves to support a lower shield below the cooking chamber. The present invention is provided to resolve these and other needs.

Traditional barbecues included a fire bowl, a grill and a bag of charcoal, and most recently, gas tanks and separate utensils. The barbecues in the marketplace do not provide sufficient workspace during the cooking process. In addition, the barbecues are not specifically designed to be compact and to incorporate all the above components into the fire bowl during storage or transport of the barbecue and at the same time, being conveniently removable from the fire bowl prior to usage of the barbecue.

SUMMARY OF THE INVENTION

The present invention provides a cooking apparatus and system designed to be compact and functional during storage and transport and to provide convertible workspace during usage of the barbecue.

In one embodiment, the present invention relates to a portable barbecue grill assembly comprising: a fire bowl having a topside opening; at least one handle attached to the fire bowl; and at least one shelf pivotally attached to the handle, and the shelf is foldable inwardly towards the topside opening of the fire bowl during a stowage position and extendable outwardly away from the topside opening of the fire bowl during a usage position.

In another embodiment, the handle is directly attached to the fire bowl. In yet another embodiment, the shelf is directly attached to the handle. In still another embodiment, at least a portion of the shelf is situated above at least a portion of the topside opening of the fire bowl during said stowage position.

In still yet another embodiment, the assembly further comprises a grill, and at least a portion of the shelf is generally parallel to the grill during the stowage position. In a further embodiment, the assembly further comprises a base, and the fire bowl is mounted on the base. In yet a further embodiment, the fire bowl comprises opposing ends, and the first handle is attached to the first end of the fire bowl.

In still a further embodiment, the assembly further comprises a second handle, and the handle is attached to the second opposing side of the fire bowl. In still yet a further embodiment, the assembly further comprises a second shelf, and the shelf is pivotally attached to the handle, and the shelf is foldable inwardly towards the topside opening of the fire bowl during a stowage position and extendable outwardly away from the topside opening of the fire bowl during a usage position. In another embodiment, the second handle is directly attached to the fire bowl. In yet another embodiment, the second shelf is directly and pivotally attached to the second handle.

In still another embodiment, the assembly further comprising at least one lid. In yet still another embodiment, the lid is pivotally attached to the fire bowl. In a further embodiment, the lid is directly and pivotally attached to the fire bowl. In yet a further embodiment, the shelf is suspended over the topside opening of said fire bowl during the stowage position. In still a further embodiment, the shelf is situated within the fire bowl during the stowage position.

In a further embodiment, the present invention relates to a portable barbecue assembly comprising: a cooking chamber comprising a fire bowl and a topside opening, and the fire bowl having opposing sides; at least two handles, each handle is attached to the opposing sides of the fire bowl; and at least two shelves, each shelf is pivotally attached to each of the handles, and the shelves are foldable inwardly towards the topside opening of the cooking chamber during a stowage position and extendable outwardly away from the topside opening of the cooking chamber during a usage position.

In another further embodiment, the handles are directly attached to each of the opposing ends of the fire bowl. In still another further embodiment, each of the shelves is directly attached to each of the handles. In yet another further embodiment, at least a portion of each of the shelves is situated above at least a portion of the topside opening of the cooking chamber during the stowage position.

In still another embodiment, the assembly further comprises a grill, and at least a portion of each of the shelves is generally parallel to the grill during the stowage position. In still yet another embodiment, the assembly further comprises a base, and the fire bowl is mounted on the base.

In a further embodiment, the assembly further comprises a grill, and at least a portion of the grill is situated within the fire bowl. In yet a further embodiment, the assembly further comprises at least one lid. In still a further embodiment, the lid is pivotally attached to said fire bowl. In still yet a further embodiment, the lid is directly and pivotally attached to the fire bowl.

In another further embodiment, each of the shelves is suspended over the topside opening of the fire bowl during the stowage position. In yet another further embodiment, each of the shelves is situated within the fire bowl during the stowage position.

In still another embodiment, the present invention provides for a cooking apparatus comprising: a fire bowl comprising a topside opening; at least one handle attached to the fire bowl; at least one grill situated within the topside opening of the fire bowl; and at least one shelf is pivotally attached to the handle, and the shelf is foldable inwardly towards the topside opening of the fire bowl during a stowage position and extendable outwardly away from the topside opening of the fire bowl during a usage position, and the shelf is situated above the grill during the stowage position.

In another embodiment, the handle is directly attached to the fire bowl. In yet another embodiment, the shelf is directly and pivotally attached to the handle. In still another embodiment, the apparatus further comprises a lid, and the lid is pivotally attached to the fire bowl.

In one embodiment, the present invention relates to a portable barbecue grill assembly comprising: a cooking chamber comprising a fire bowl mounted on a base; and at least one shelf being directly and pivotally attached to the base, the shelf being foldable inwardly towards the cooking chamber during a stowage position and extendable outwardly away from the cooking chamber during the usage position and having a distance between the shelf and the cooking chamber to avoid heat damage to the shelf when the cooking chamber is in use.

In another embodiment, at least a portion of the shelf is situated above and suspended over the cooking chamber during the stowage position. In still another embodiment, the base is a frame assembly. In yet another embodiment, the frame assembly comprises at least one main frame member, the main frame member has opposing ends, the shelf is directly and pivotally attached to at least one of the opposing ends of the main frame member.

In still yet another embodiment, the frame assembly comprises at least two main frame members, each of the main frame members comprising opposing ends, the shelf being directly and pivotally attached to at least one of each of the opposing ends of each of said main frame members. In a further embodiment, the assembly further comprises at least one handle connected to at least one of the opposing ends of the main frame member; and a lid mountable on the cooking chamber. In yet a further embodiment, the handle provides support for the shelf during the use position.

In still a further embodiment, the assembly further comprises a second shelf, the second shelf being directly and pivotally connected to the base, the shelf being foldable and situated above the fire bowl during a stowage position and extendable from the fire bowl during the usage position. In still yet a further embodiment, at least a portion of the second shelf is situated above and suspended over the cooking chamber during the stowage position. In another further embodiment, the assembly further comprises a second handle.

In another embodiment, the present invention provides for a portable barbecue grill assembly comprising: a cooking chamber comprising a fire bowl mounted on a base; and at least two shelves being directly and pivotally attached to the base, at least a portion of each of the shelves being foldable and situated above the cooking chamber during a stowage position and extendable from the cooking chamber during the usage position and having a distance between the shelf and the cooking chamber to avoid heat damage to the shelves when the cooking chamber is in use.

In a further embodiment, the present invention also provides for a portable barbecue grill assembly comprising: a cooking chamber comprising a fire bowl mounted on a base; and at least one shelf being directly and pivotally attached to the base, the shelf being foldable into the fire bowl during a stowage position and away from the fire bowl during the usage position and having a distance between the shelf and the fire bowl to avoid heat damage to the shelf when the fire bowl is in use.

In another embodiment, the present invention also relates to a portable barbecue grill assembly comprising: a cooking chamber comprising a fire bowl mounted on a supporting frame; and at least one shelf being directly and pivotally attached to the supporting frame, at least a portion of the shelf being foldable into the cooking chamber during a stowage position and extendable from the cooking chamber during the usage position and having a distance between the shelf and the cooking chamber to avoid heat damage to the shelf when the cooking chamber is in use.

In still another embodiment, the supporting frame comprises at least one main frame member, the main frame member has opposing ends, the shelf being directly and pivotally attached to at least one of the opposing ends of the main frame member. In yet another embodiment, the supporting frame comprises at least two main frame members, each of the main frame members comprising opposing ends, the shelf being directly and pivotally attached to at least one of each of the opposing ends of each of the main frame members.

In still yet another embodiment, the assembly further comprises at least one handle connected to at least one of the opposing ends of the main frame member; and a lid mountable on the cooking chamber. In a further embodiment, the handle provides support for the shelf during the use position. In another further embodiment, the assembly further comprises a second shelf and a second handle, the second shelf being directly and pivotally connected to the supporting frame, the shelf being foldable into the fire bowl during a stowage position and extendable from the fire bowl during the usage position. In yet a further embodiment, the second shelf is situated opposite of the first shelf, the second shelf is pivotally attached to each of the opposing ends of the main frame member and the second handle being situated opposite of the first handle, the second handle being connected to each of the opposing ends of each of the main frame members.

In one embodiment, the present invention relates to a cooking apparatus comprising a fire bowl and at least one shelf pivotally mounted to the fire bowl, wherein the shelf is movable between a stowage position within the fire bowl to a usage position located externally of the fire bowl. In another embodiment, the fire bowl has an internal chamber and the apparatus further comprises a grill located within the internal chamber. In another embodiment, the apparatus has a second shelf pivotally mounted to the fire bowl, wherein the second shelf is movable between a stowage position within the fire bowl to a usage position located exteriorly of the fire bowl. In still another embodiment, the first shelf is aligned with the second shelf in both the stowage position and the usage position. In yet another embodiment, fire bowl terminates into at least one end portion and the shelf is pivotally mounted to the end portion.

In still yet another embodiment, the fire bowl is mounted on a supporting frame and the apparatus further comprises at least one leg. In a further embodiment, the fire bowl is mounted on a supporting frame, and the supporting frame has at least one handle, and the shelf rests on the handle when the shelf is in the usage position. In still a further embodiment, the supporting frame includes a pair of leg members, each of the leg member are pivotally movable between a retracted position and an extended position, and the leg members are adapted to be in contact with the supporting surface in both the retracted position and the extended position, and the fire bowl is located further from the supporting surface when the leg members are in the extended position as opposed to the retracted position.

In yet a further embodiment, the shelf in the usage position has a working surface. In still yet a further embodiment, the shelf comprises at least one utensil retaining groove. In another embodiment, the shelf has a working surface in the usage position and a utensil is to be located within the utensil retaining groove so the utensil is located beneath the working surface when the shelf is in the usage position. For purposes of the invention, a utensil includes, but is not limited to, spatula, forks, and tongs. In still another embodiment, the first and second shelves have utensil storage grooves, which function to provide utensil storage locations when the first and second shelves are in the storage position.

In yet another embodiment, the apparatus comprises a lid mountable on the fire bowl. In still yet another embodiment, the lid is pivotally mounted to the fire bowl, and the lid being movable in a closed position wherein the lid covers the grill to an open position wherein the lid allows access to the grill. In a further embodiment, the supporting frame of the apparatus includes a pair of main frame members, each the main frame member are channel shaped defining an internal cavity, and the leg is mounted within the internal cavity.

In another embodiment, the first shelf is situated atop the second shelf in a staggered position during the stowage position. In still another embodiment, the shelf rests upon the grill during the stowage position.

In still a further embodiment, the barbecue cooking system comprises a fire bowl having an internal chamber, a grill located within the internal chamber; a lid mountable on the fire bowl; a stand for supporting the fire bowl; and at least one shelf pivotally mounted to the fire bowl, the shelf being foldable inwardly towards the fire bowl or cooking chamber during a storage position and extendable outwardly away from the fire bowl or cooking chamber during a usage position.

In one embodiment, the system is a stationary cooking system. In another embodiment, the system is a portable cooking system. The cooking apparatus and system of the present invention may be used for indoor and outdoor use.

In still another embodiment, the system further comprising a second shelf pivotally mounted to the fire bowl, the second shelf being foldable into the fire bowl during a stowage position and extendable from the fire bowl during a usage position. In yet another embodiment, the first shelf is aligned with the second shelf in both the storage position and the usage position.

In still yet another embodiment, the shelf comprises at least one working surface and at least one utensil retaining grooves. In a further embodiment, the stand comprises at least one movable leg. In still a further embodiment, the leg is retractable and extendable. In yet a further embodiment, the leg terminates into a wheel. In another embodiment, the fire bowl is situated upon the stand during a usage position and the stand being designed to fit onto the lid during a stowage position.

In still yet embodiment, the lid is pivotally mounted onto the fire bowl, the lid being movable from a closed position wherein the lid covers the grill to an open position wherein the lid allows access to the grill. In still yet another further embodiment, the internal chamber comprises a compartment for retaining burnable material such as coal.

In another embodiment, the system further comprising a propane tank, the tank is situated within the fire bowl during the stowage position and externally of the fire bowl during the usage position. In still another embodiment, the system further comprising at least one utensil, the utensil is positioned within the utensil-retaining groove of the shelf. In yet another embodiment, the fire bowl having a bottom which is connected to a pair of planar sidewalls with the bottom being located between the sidewalls, the bottom has an arcuate shape which extends from a fore end to an aft end, the sidewalls having a free upper edge which is substantially flush with the fore end and the aft end. In another embodiment, the shelf is foldable into the internal chamber of the fire bowl.

In a further embodiment, the present invention relates to a cooking apparatus comprising: a fire bowl having an internal chamber, a grill located within the internal chamber; a lid mountable on the fire bowl; and at least two shelves, each of the shelves are pivotally mounted to the fire bowl, each of the shelves being movable between a stowage position within the fire bowl to a usage position located exteriorly of the fire bowl. In another further embodiment, the first shelf is situated atop the second shelf in a staggered position during a stowage position. In still a further embodiment, the apparatus further comprising a stand, the fire bowl being situated upon the stand during a usage position, the stand being design to fit onto the lid during a stowage position. In yet a further embodiment, at least one of said shelves of the apparatus of present invention rests upon the grill during the stowage position.

In still another embodiment, the present invention relates to a cooking apparatus comprising: a fire bowl; and a supporting frame being mounted on the fire bowl, at least one pair of leg members being pivotally mounted on the supporting frame and movable between a retracted position and an extended position, the leg members adapted to be in contact with a supporting surface in both the retracted and extended positions, the fire bowl being located further from the supporting surface when the leg members are in the extended position as opposed to the retracted position. In yet another embodiment, the leg members are crossed when in the retracted position. In still yet another embodiment, the leg members are located parallel and spaced apart when in the extended position.

In another embodiment, the present invention relates to a method of manufacturing a cooking apparatus, the method comprising: providing a fire bowl having an internal chamber; positioning a grill within the internal reservoir; and pivotally mounting at least one shelf onto the fire bowl, the shelf being movable between a stowage position within the fire bowl to a usage position located exteriorly of the fire bowl.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

FIG. 14 is an isometric view of the cooking apparatus of the present invention showing an embodiment of the cooking apparatus in its most compact position with the lid being mounted on the fire bowl and the leg assembly of the supporting frame in a retracted position;

FIG. 15 is a cross-sectional view through the leg assembly of the supporting frame of the cooking apparatus taken along line 2-2 of FIG. 14;

FIG. 16 is an isometric view of the cooking apparatus showing the lid removed and also showing a propane tank and utensils being mounted in a stowed position in conjunction with a pair of shelves that are also located in a stowage position on the grill of the cooking apparatus and with the leg assembly of the supporting frame being located in the extended (usage) position;

FIG. 17 is a cross-sectional view through the leg assembly taken along line 4-4 of FIG. 16;

FIG. 19 is an isometric view of another embodiment of cooking apparatus of this invention showing the cooking apparatus in its most compact position with the lid being mounted on the fire bowl and the leg assembly of the supporting frame in the retracted position;

FIG. 20 is a cross-sectional view through the lid latching assembly of the cooking apparatus taken along line 7-7 of FIG. 19 with this latching assembly being also employed within all embodiments of this invention that utilize a propane tank;

FIG. 23 is an isometric view of still another embodiment of cooking apparatus of this invention showing the cooking apparatus in its most compact position with the lid being mounted on the fire bowl and the leg assembly of the supporting frame in a retracted position;

FIG. 24 is a cross-sectional view taken along line 11-11 of FIG. 23 showing the mounting arrangement;

FIG. 25 is a cross-sectional view similar to FIG. 24 showing the lid being disengaged from the fire bowl where in FIG. 24 the lid was engaged with the fire bowl;

FIG. 28 is an isometric view of the fire bowl of the cooking apparatus showing the shelves being moved from the stowage position to an outwardly extended position.

Figure 1:
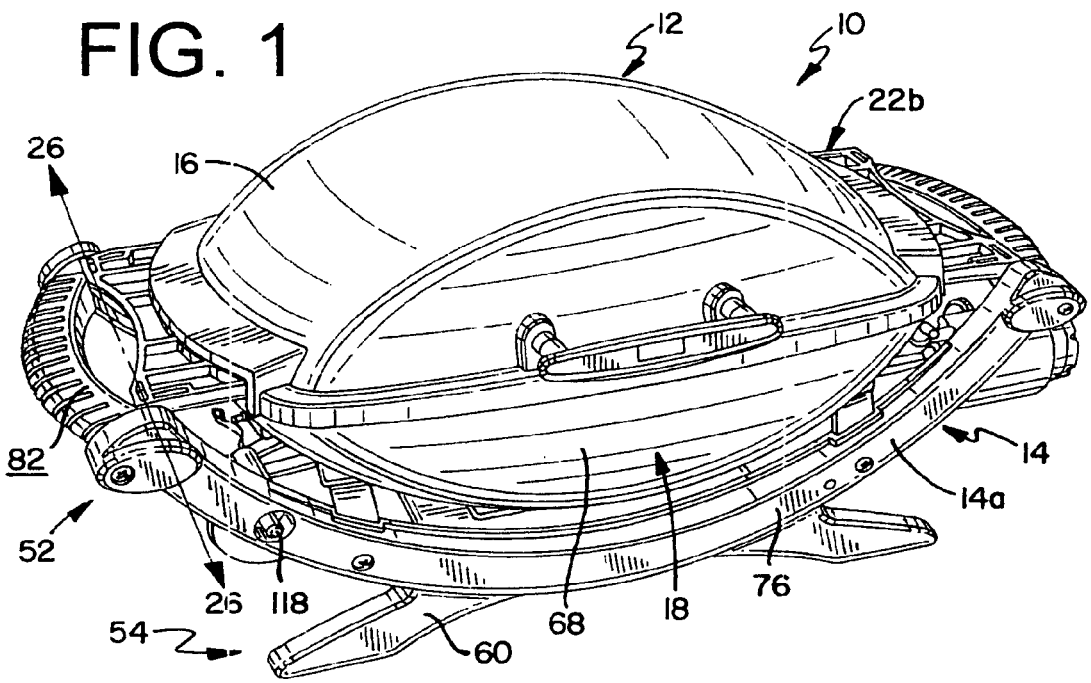
FIG. 1 is a perspective view of a barbecue grill assembly according to the present invention, showing a frame structure and a cooking chamber in closed position.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Referring now to FIGS. 1 to 13, the present invention provides a barbecue grill assembly 10, as is shown in the Figures of the invention. The barbecue grill assembly 10 generally includes a cooking chamber 12 and a support frame assembly 14. The support frame assembly 14 is adapted to provide support to the cooking chamber 12 and has a front structure 14a and a rear structure 14b. The cooking chamber 12 includes a cover 16 that is preferably connected to a firebox 18 by a hinge mechanism 17. The cover 16 has a lower edge 19 that is dimensioned to substantially mate with an upper edge 20 of the firebox. The mating of the cover lower edge 19 and the firebox upper edge 20 occurs when the cover 16 is placed over the firebox 18 such that the cooking chamber 12 is in a closed arrangement. In this manner, the upper edge 19 is in alignment with the lower edge 20, even though there are preferably areas of the cooking chamber that provide an opening or a space 21 between the cover 16 edge 19 and the firebox 18 edge 20 (see FIGS. 8, 9, and 10). Such openings 21 between the cover 16 and the firebox 18 are provided for passage of side shelves 22 into the cooking chamber 12 for the shelf or shelves 22 to be placed into a non-use or storage configuration, such as is shown in FIGS. 1, 2 and 11 through 13.

A grate 24 is removably positioned generally within the firebox 18. The grate 24 defines a cooking surface upon which food is placed during operation of the grill assembly 10. In a preferred embodiment, at least one side shelf 22 resides above and adjacent the grate 24 when the shelf 22 is in the storage configuration. In the embodiment shown in the Figures, at least one shelf 22 is secured to a portion of the frame assembly 14 along a hinge line 26. Rotation, or pivoting, of the shelf 22 along the hinge line 26 provides selected movement of the shelf 22 from a first position 22a in which the shelf 22 resides adjacent the firebox 18 and in spaced relationship from the firebox 18. When the shelf 22 is in the first position 22a, at least a portion of the shelf 22 provides a work surface 28 of the shelf exposed for use during cooking. In the shelf arrangement of 22a, the shelf 22 extends generally horizontally adjacent the cooking chamber 12, thereby providing a generally horizontal platform of the work surface 28.

Figure 2:
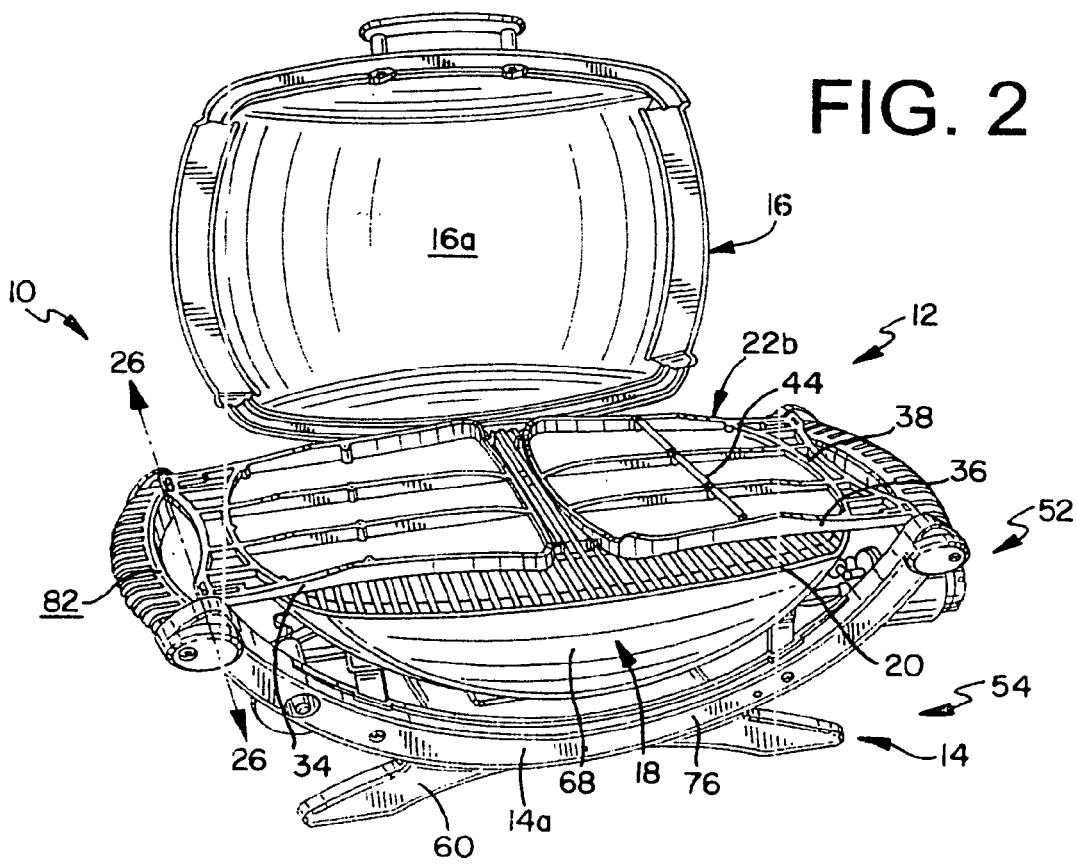
FIG. 2 is a perspective view of the grill assembly of FIG. 1 showing the cooking chamber in an open position and collapsible shelves in non-use position.
Figure 3:
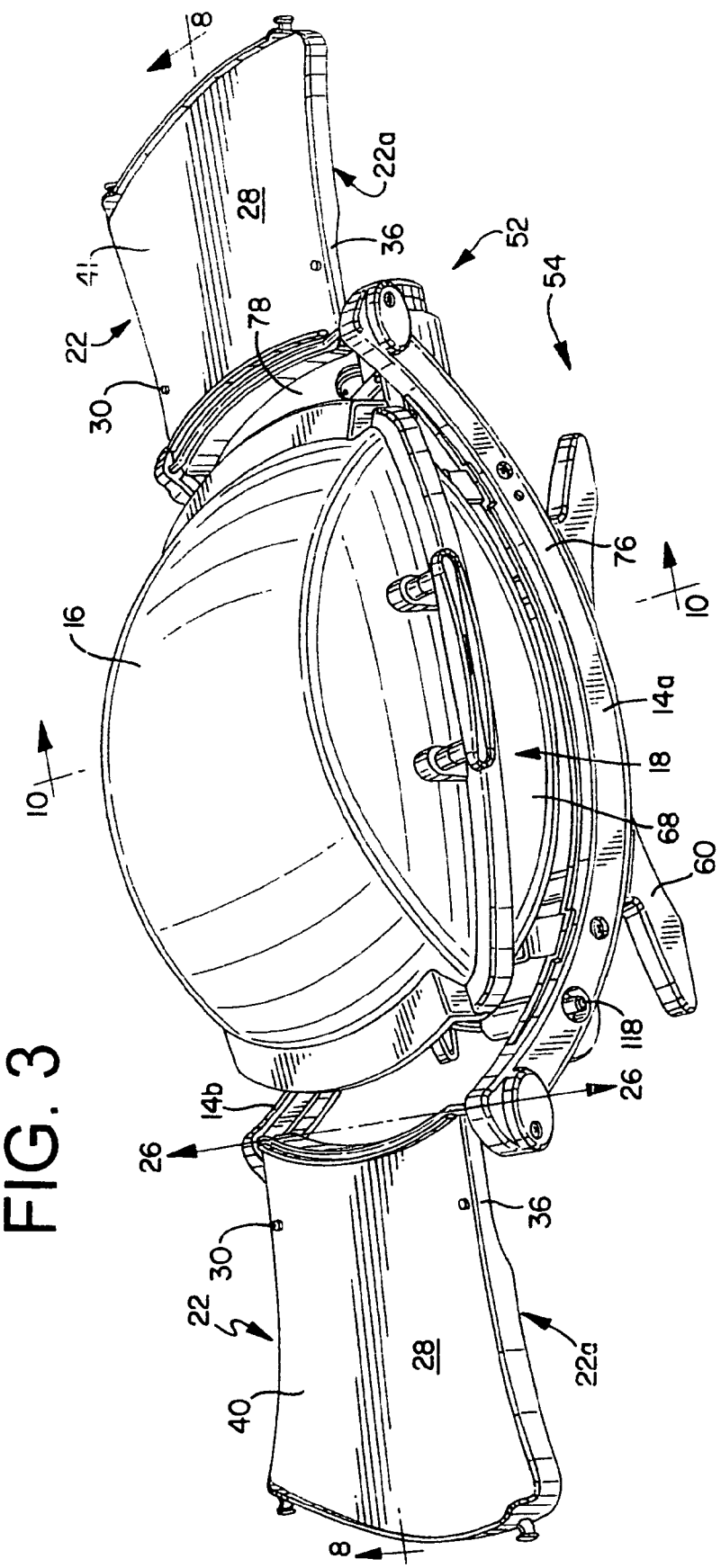
FIG. 3 is a perspective view of the grill assembly of FIG. 1 showing the cooking chamber in a closed position and the collapsible shelves in an extended, or use, position.
Figure 4:
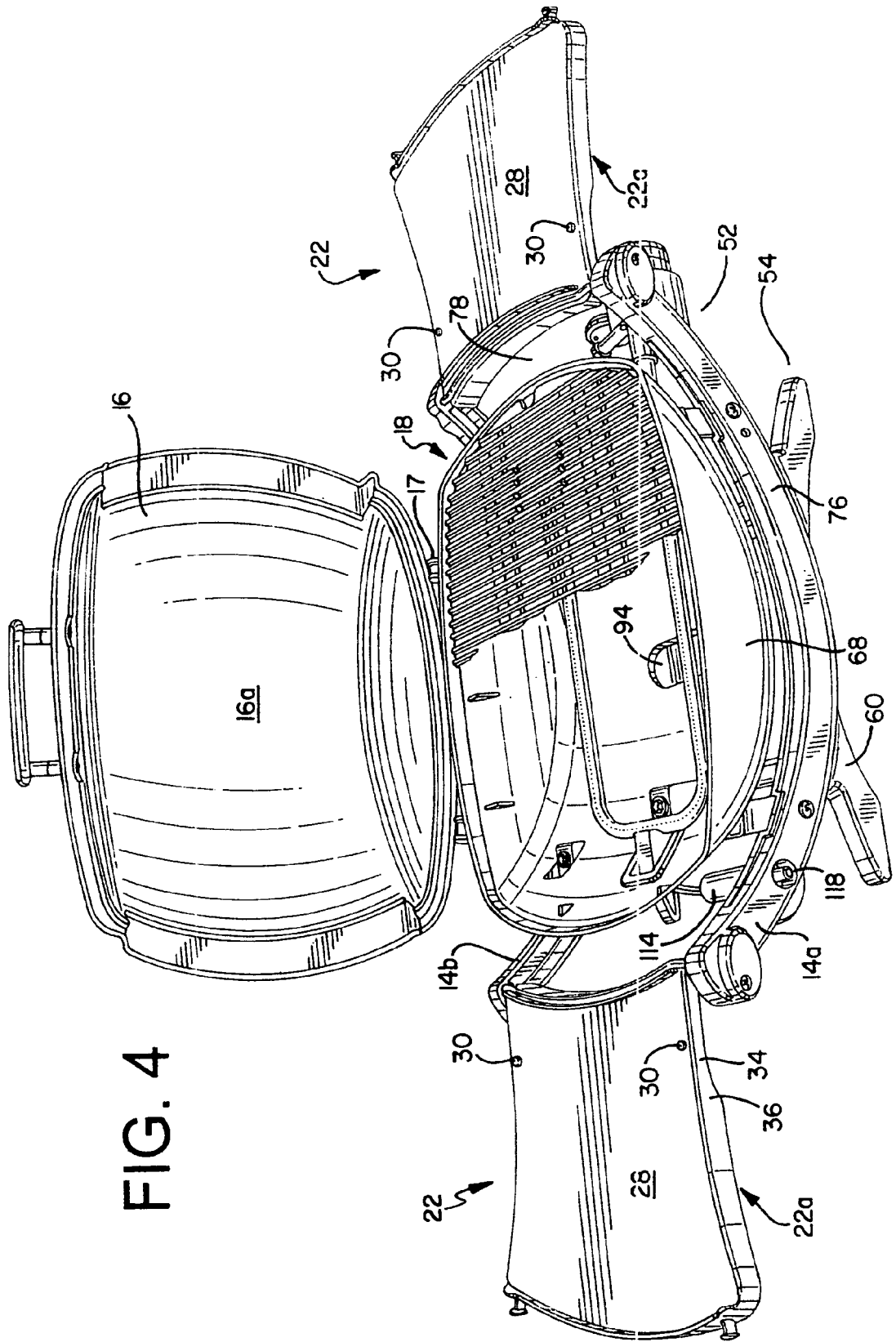
FIG. 4 is a perspective view of the grill assembly of FIG. 3 showing the cooking chamber in an open position and the shelves in a use position, with a partial section view of the grate shown to provide a view of the inner portion of the bottom of the cooking chamber.
Figure 5:
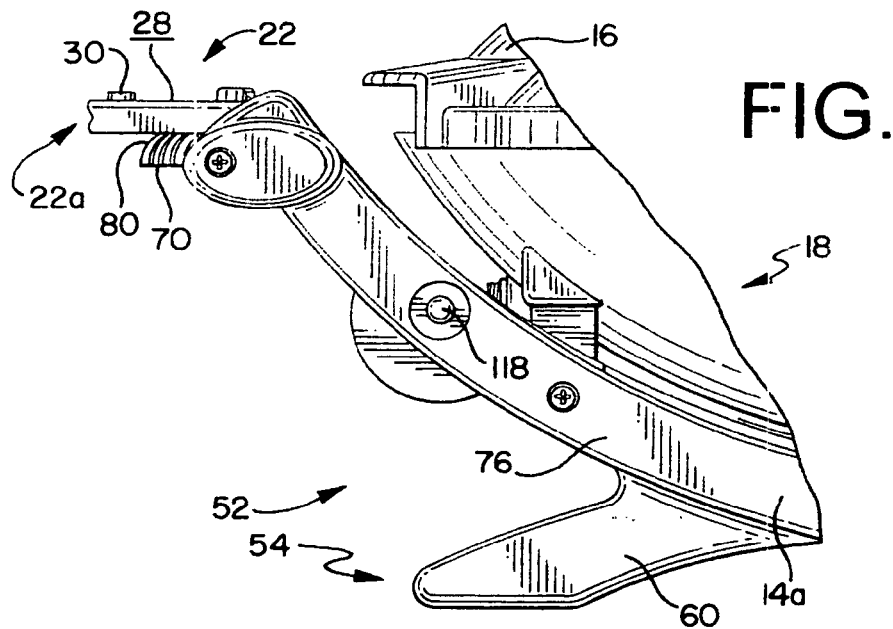
FIG. 5 is a front view of a portion of the grill shown in FIG. 3, showing the left side of the grill and frame assembly, and a portion of the collapsible shelf in the use position.
Figure 6:
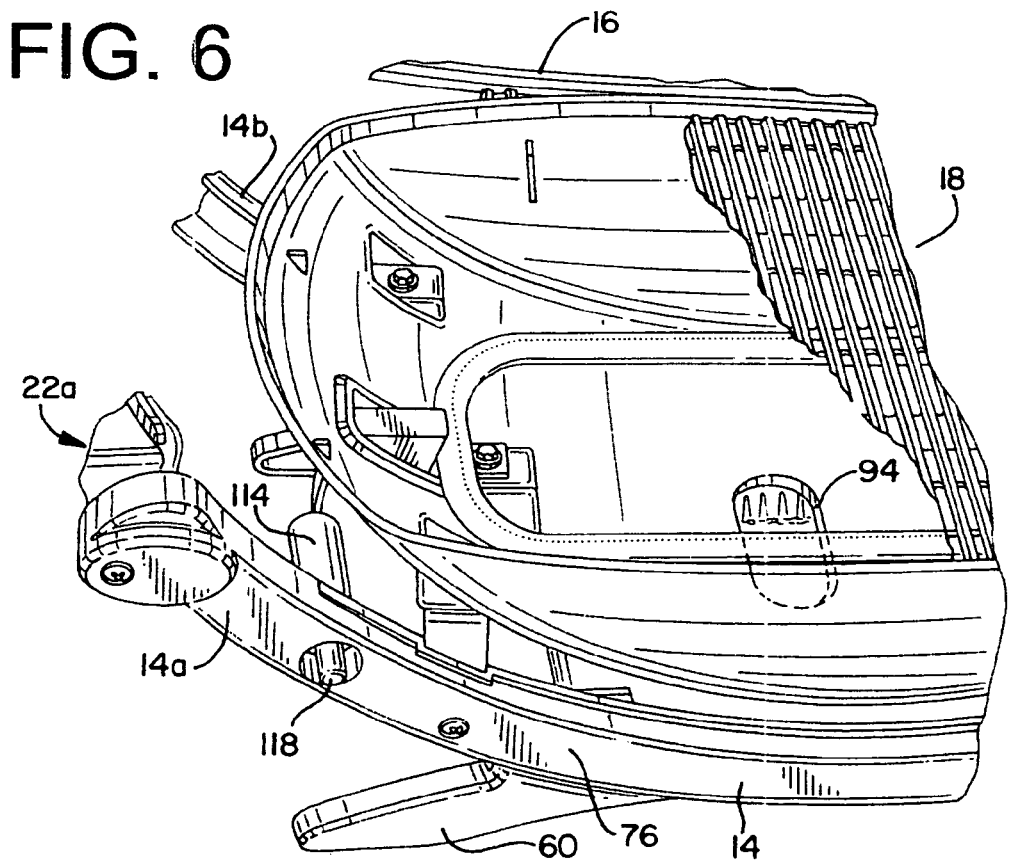
FIG. 6 is an enlarged view of a portion of the grill assembly shown in FIG. 4, showing the grill grate in partial section view to provide a view of a portion of the bottom area of the cooking chamber and the opening in the bottom of the cooking chamber.

When the shelf is moved to the storage arrangement 22b, the shelf is pivoted about the hinge line 26, such that the work surface 28 is positioned facing the grate 24 within the cooking chamber 12. As shown in FIG. 2, the shelf 22 in the second position 22b thereby has at least a portion of the shelf 22 within the cooking chamber 12, supported within the chamber 12 above the grate 24. In this manner, the shelf 22 passes from the hinge line 26 adjacent and outside the firebox 18, through the opening 21 between the cover 16 and the firebox 18, to partially reside within the chamber 12 above the grate 24. In a preferred embodiment, the shelf 22 is adapted to provide contact with the cooking chamber 12 such that the shelf 22 is supported by the cooking chamber at the contact. In the embodiment shown in the figures, the contact structure of the shelf 22 includes a projecting surface from the shelf 22, such as at least one boss 30 of the shelf 22. The boss 30 is adapted to provide supporting contact 32 (FIG. 12) for the shelf 22 to be supported on a portion of the cooking chamber 12, and preferably at the upper edge 20 of the firebox 18. In the embodiment shown in the figures, the shelf 22 is formed of plastic or the like, and the boss 30 is a heat resistant material, such as a metal pin or grommet boss 30. Also, in another embodiment, the boss 30 extends outward from the work surface 28 of the shelf 22 to provide the supporting contact 32 in spaced relationship from the firebox 18, thereby assuring that the shelf 22 does not make contact directly with the cooking chamber 12 when in the second position 22b.

The shelf 22 is supported primarily by the connection of the shelf 22 to the frame assembly 14 along hinge line 26, wherein the support is provided as a cantilever support of the shelf 22 in the first position 22a. In the embodiment shown in the figures, the shelf 22 is freely movable in rotation about the hinge line 26 from the first position 22a to the second position 22b, without being locked in either location. However, it is contemplated that the assembly 10 may also include a locking member (not shown) for the shelf 22 to be releasably secured in the first position 22a and/or the second position 22b.

In the embodiment shown in the figures, the shelf 22 is at least partially secured in the second position 22b by being trapped between the firebox 18 and the cover 14. In this embodiment, the shelf has a thickness 34 having an extent that substantially mates with the opening 21 for the shelf 22 to pass into the cooking chamber 18. The thickness 34 of the shelf shown in the figures includes the combination of the work surface 28, side edges 36 and at least one strengthening rib 38 or ridge positioned on the bottom surface 39 of the shelf 22 (see FIG. 11). In this arrangement of cooperative structure combining to form the thickness 34 to substantially cover the opening 21, the ridge 38 is adapted to block water or the like from entering the cooking chamber along the surface 39 of the shelf 22, even though adjacent areas of the surface 39 comprise a recess or compartment such as when the shelf is made with thinner material and the strengthening ridges 38 reside on the surface 39 to provide strength or beam-strength rigidity of the shelf 22.

Figure 12:
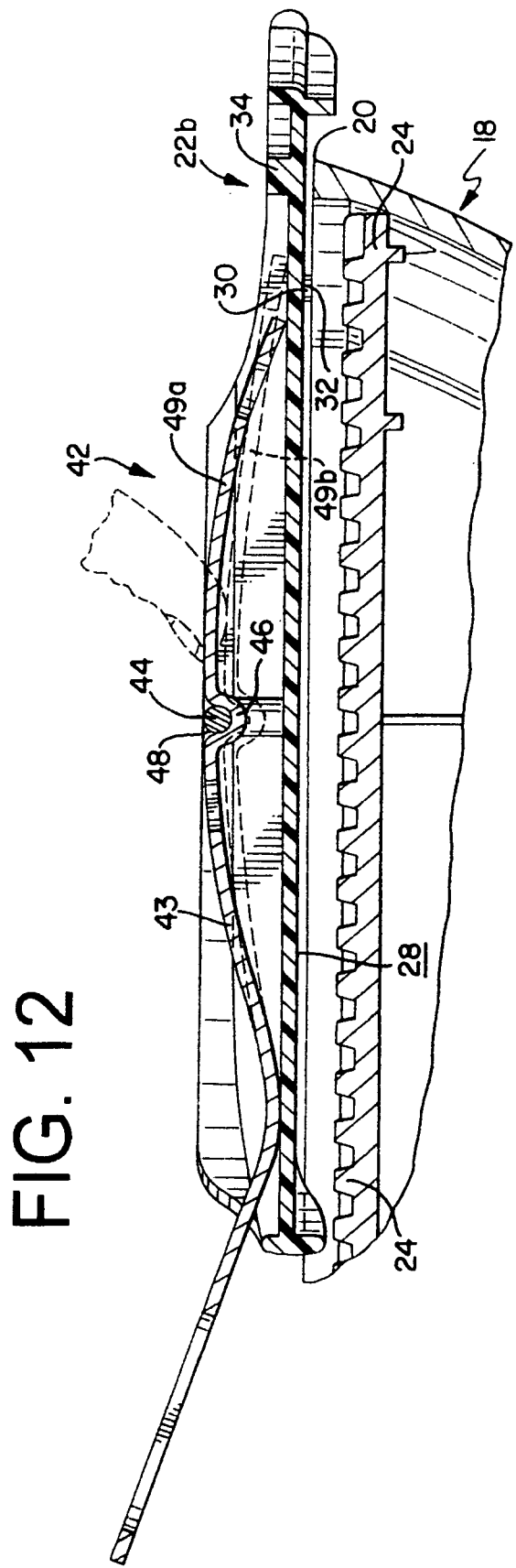
FIG. 12 is a cross sectional view of a portion of the grill assembly structure taken along 12-12 of FIG. 11.

In still another embodiment, the assembly 12 includes two shelves 22, a first shelf 40 and a second shelf 41. The first shelf 40 is located on one side of the cooking chamber 12 and the second shelf 41 is located on a generally opposed side of the cooking chamber 12. In this arrangement, the two shelves 40, 41 each are rotatable about independent hinge lines 26 to move the shelves 40, 41 into the cooking chamber area such that both shelves together fit in to shelf storage positions 22b above the grate 24. Further, at least one shelf 22 includes a utensil mounting assembly 42, preferably located on the bottom surface 39 of the shelf 22. The mounting assembly 42 is adapted to hold cooking utensils 43 on the shelf 22 for storage of the utensils 43, by a locking component 44 adapted to provide frictional engagement of the utensil 43 to be removably secured, such as by the user pushing down on a portion of the utensil (see FIG. 12). Engagement of the utensil 43 to the locking component 44 preferably includes mating of a recess 46 and a projection 48. In the embodiment shown, the recess 46 is positioned on the utensil 43 and the projection 48 is located on the locking component 44. However, the location of the mating recess 46 and projection 48 may be in reversed arrangement on the structures. In the arrangement of the recess 46 and projection 48, the user removes the utensil 43 by pushing at least a portion of the utensil 43 from a first position 49a wherein the projection 48 is within the receiver 46 to a second position 49b wherein the projection 48 is not within the receiver 46 and the utensil 43 may thereby be removed (FIG. 12).

Figure 7:
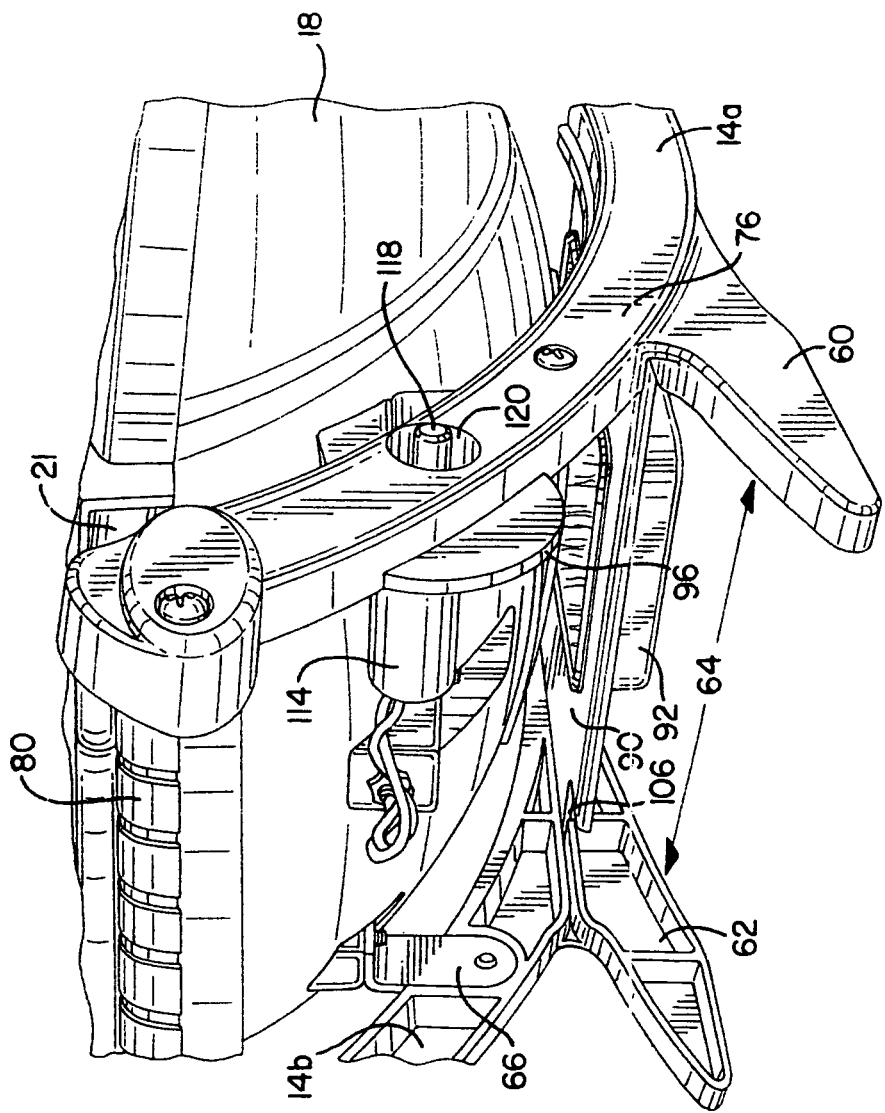
FIG. 7 is a partial side perspective view of the grill assembly shown in FIG. 1, showing detail of the mounting of a frame member to the cooking chamber, and showing detail of the grease collection tray in the frame assembly.
Figure 8:
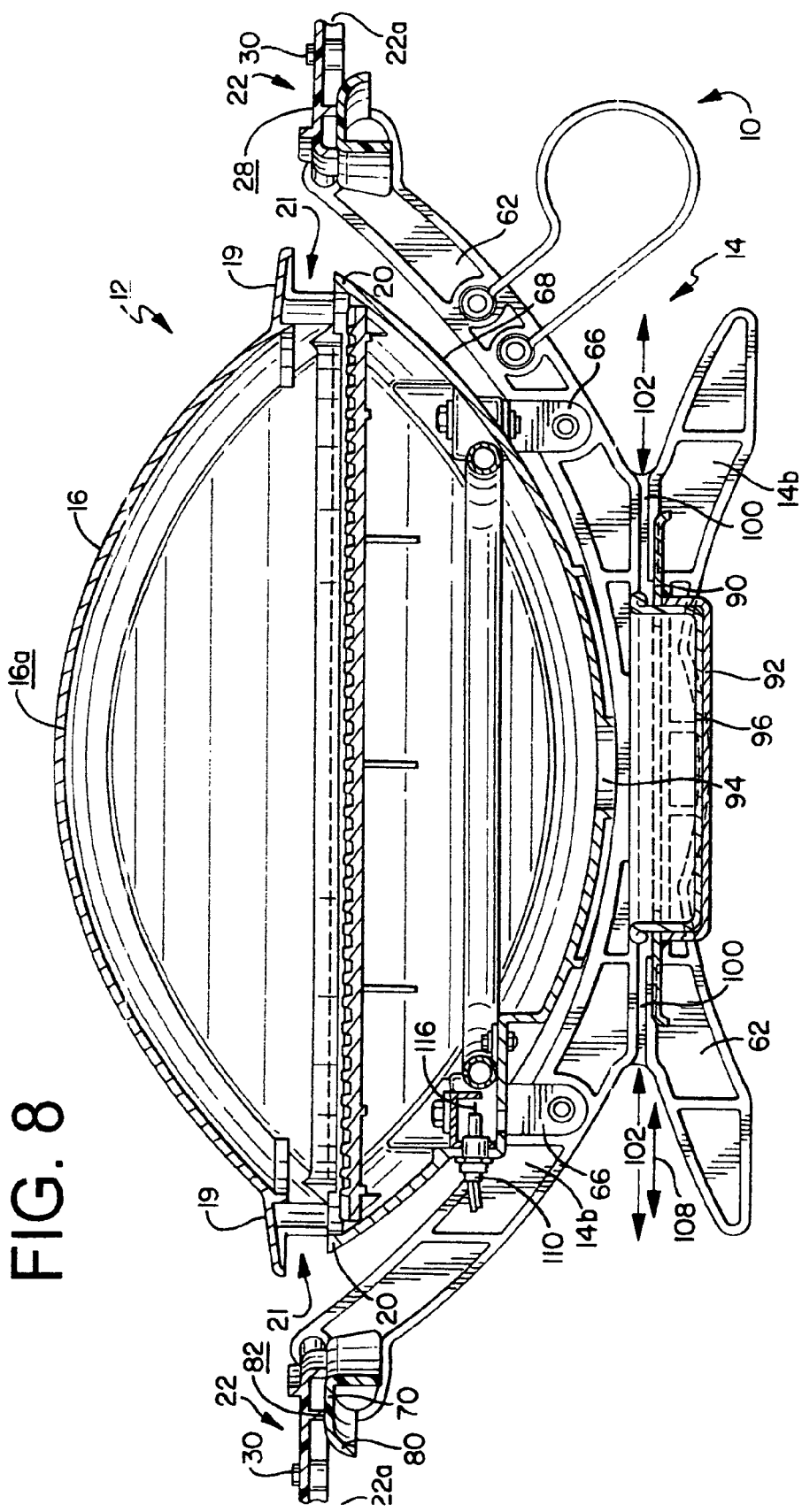
FIG. 8 is a partial view of the grill shown in FIG. 3, taken along section lines 8-8 of FIG. 3.
Figure 10:
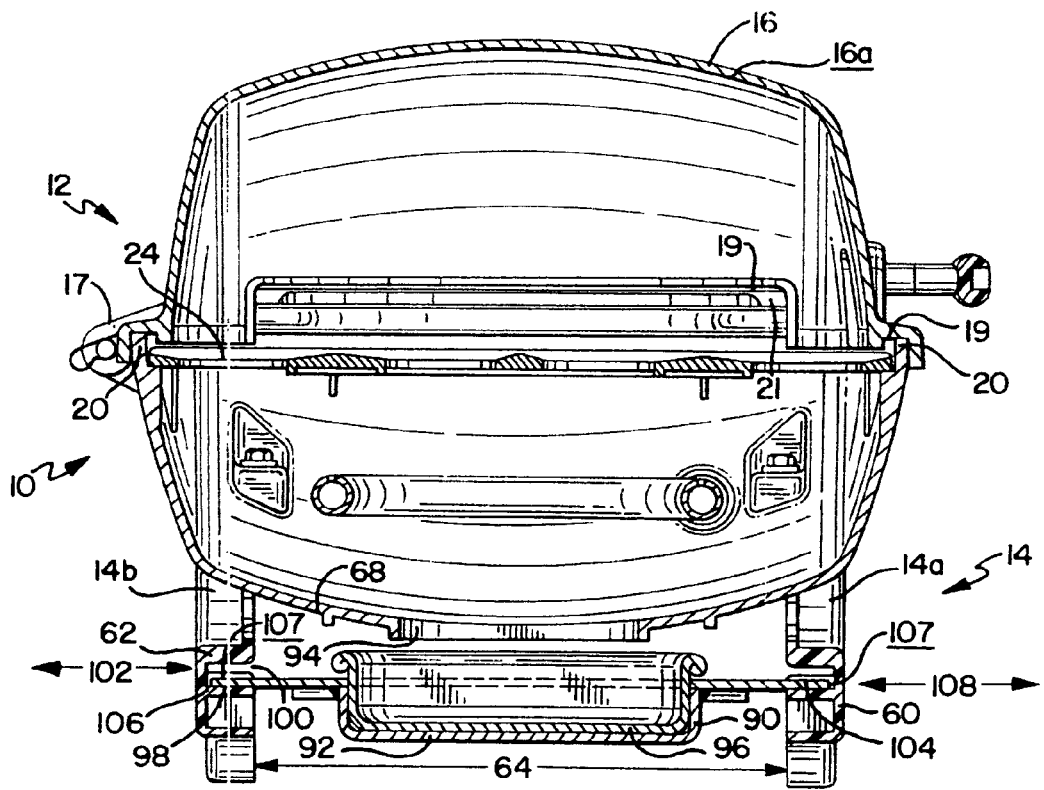
FIG. 10 is a cross sectional view of the grill along 10-10 of FIG. 3.
Figure 11:
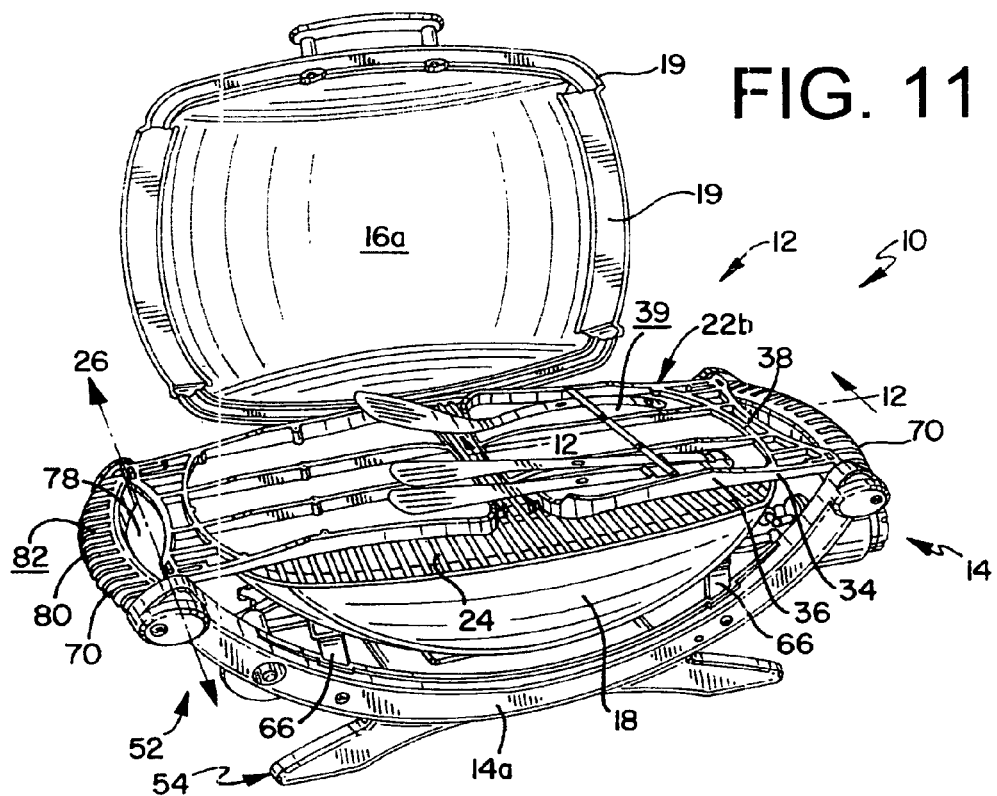
FIG. 11 is the grill assembly of FIG. 2 with the addition of showing cooking utensils secured to one of the shelves.
Figure 13:
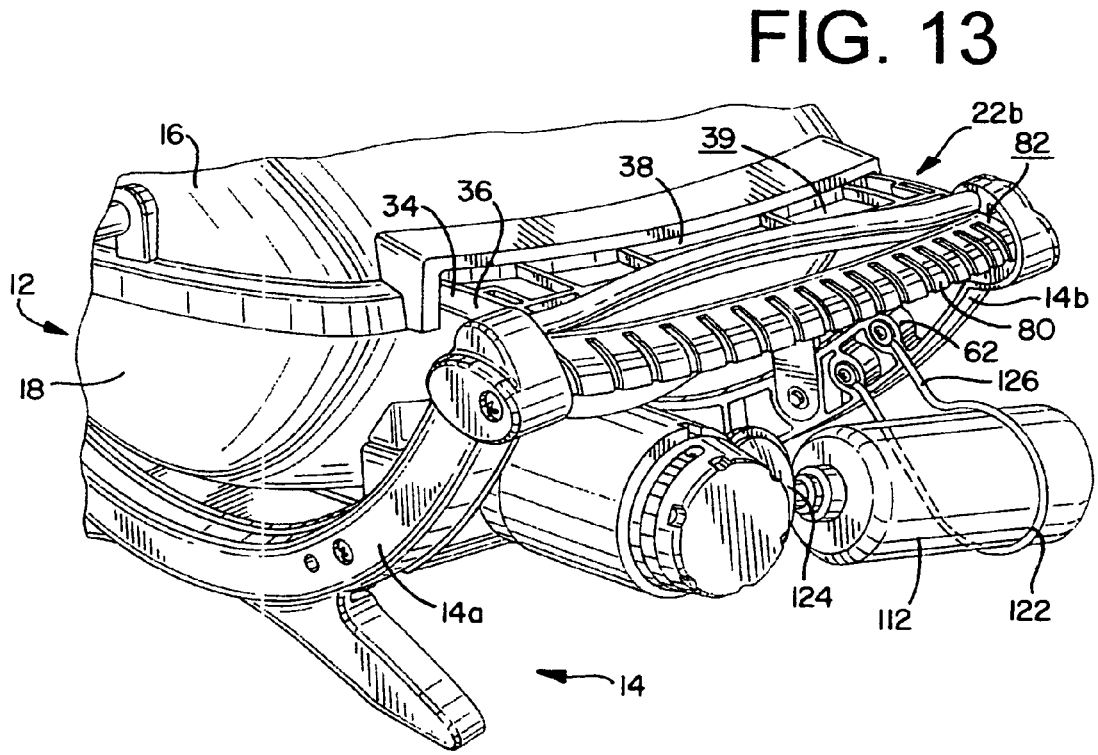
FIG. 13 is an elevated perspective view of part of a side of the grill assembly of FIG. 1, showing attachment of a gas tank as a fuel supply, with the gas tank being in the secured position with the grill assembly.

The frame assembly 14 is made up of a plurality of frame members. The frame members are preferably each of preformed construction having an upper portion 52 and a lower portion 54. In yet another embodiment, the frame assembly 12 is comprised of at least two frame member assemblies, a first frame member 60 and a second frame member 62. The first and second frame members 60, 62 are secured in position for supporting the cooking chamber 12 by being mounted to the chamber 12 in spaced relationship, having an extent of space 64 between the frame members 60, 62 (FIGS. 7 and 10). The frame members 60, 62 are secured at the spaced extent 64 by securement of the frame members 60, 62 to the firebox by at least one mounting member 66 joining the frame members 60, 62 to the firebox 18 of the cooking chamber 12. In the embodiment shown in the Figures, the mounting member 66 includes a plurality of tabs (FIG. 8) extending from the firebox 18 outer wall 68, at the underside and bottom portion of the firebox 18. The mounting members 66 thereby cooperatively mate with surfaces of the frame members 60, 62 and a fastened to the frame to secure the frame assembly 14 adjacent, and in spaced relation to, the firebox 18. In the grill shown, the mounting of the frame to the firebox 18 in this manner serves to secure the lower portion of the frame members 60, 62 in position without the need for lateral cross members between the frame members 60, 62 beneath the fastening at the mounting members 66.

The frame assembly 14 also includes at least one cross member assembly 70 positioned at the upper portion of the frame members 60, 62. The cross member 70 is adapted to provide an upper frame connection perimeter for further fixing the frame members 60, 62 in position and separated by an extent of space. The connection perimeter includes two cross members 70, a first cross member 72 and a second cross member 74. The cross members 70 preferably each have one end connected to the first frame member 60, and an opposed end connected to the second frame member 62. The mounting members 66, as shown in the preferred form in the Figures, include elongated tabs of metal, the tabs are fastened to the firebox 18 and extend therefrom. The fastened tabs is especially useful to provide mounting for the frame 14 to the cooking chamber 12, where the firebox is constructed of metal, such as sheet metal or cast metal (aluminum), and the frame 14 is at least partially constructed of other material such as plastic. Since the outer wall of the firebox inevitably will get hot when using the grill, securing a separate tab for mounting the firebox 18 to the plastic frame 14 will provide a mounting assembly that reduces heat transfer to the frame 14.

In another embodiment of the invention, the shelf 22 has a void area 78. The void area of the shelf 22 is located in the area between the hinge line 26 and the firebox 18 when the shelf 22 is in the first position 22a, thereby providing a gap or space between the shelf and the side of the firebox 18. This spacing of the shelf provides a distance for the shelf from the heat emitted at the side of the firebox, especially useful when the shelf is made of plastic. When the shelf 22 is placed in the second position 22b, the void area 78 exposes a portion of the cross member that thereby provides a handle 80 for the user to move the grill.

In yet another aspect of the invention, the frame 14 is formed of generally X-shaped frame members 60, 62. The upper portion of the frame members 60, 62 extend radially upward and outward from a central body region 76, and the lower portion of the frame members 60, 62 extend radially outward and downward from the central body region 76. In this embodiment, mounting of the firebox 18 to the frame members 60, 62 by the mounting members 66 is located at the central body region 76 of the frame members 60, 62. The lower extending portion of the frame members 60, 62 thereby are adapted to serve as supporting legs of the grills assembly 10. The legs are formed of a unified structure extending from the central body portion 76, adapted to extend with sufficient rigidity to support the cooking chamber 12 with legs in spaced relationship 64 without the need for cross members securing the legs together. In this arrangement, the grill assembly frame 14 is formed solely from two frame assemblies joined by cross members at one portion of the frame 14, in cooperation with being joined to the firebox at another portion of the frame 14.

The upper cross member(s) 70 include a handle 80 with a gripping portion 80a. Because the cross member is secured between the frame members 60, 62, the cross member 70 is securely fastened such that a portion of the cross member itself may be adapted to provide the handle 80. This is shown in the Figures, as the cross member 70 includes a curved handle that is suitably dimensioned to provide a gripping portion 80a for a user to grasp and transport or lift the grill assembly 10. As is also shown, still yet another embodiment of this assembly 10 provides securement of the shelf 22 along the hinge line 26 immediately adjacent the cross member 70. The shelf 22 is thereby supported in the first position 22a by resting on at least a portion of the upper surface 82 of the cross member 70. In a further embodiment, the shelf 22 is supported in the first position 22a solely by the combination of the cantilever support at the hinge line 26 and contact of the shelf with the upper surface 82 of the cross member 70.

The grill assembly 10 also includes a heat shield 90 mounted beneath the firebox 18 and attached to the frame 14. The heat shield 90 is preferably formed of an elongated piece of metal sheet stock. The heat shield 90 also includes a collection chamber 92, preferably in a central area of the heat shield 90, for receiving drip of grease or debris from the firebox 18. The firebox 18 has an opening 94 to allow grease or debris from cooking to fall from within the firebox 18 toward the bottom of the assembly 10. The collection chamber preferably is adapted to receive a removable receptacle 96 that is positioned below he opening 94.

The combination heat shield 90 and collection chamber 92 is preferably secured into position to substantially span the extent of the space 64 between the frame members 60, 62. The heat shield 90 thereby acts as a barrier between the bottom of the firebox 18 and the area beneath the heat shield 90. This is especially useful for the grill configuration shown in the Figures, having a compact design with short leg portions of the frame 14, as is desirable for a table-top grill design. Also, when the grill assembly is attached to a cart structure (not shown), removal of the grill assembly 10 from such a structure will not disrupt the mounting of the heat shield 90 and collection chamber 92 from position beneath the firebox 18, as the heat shield 90 remains fixed in position by the frame 14.

Figure 9:
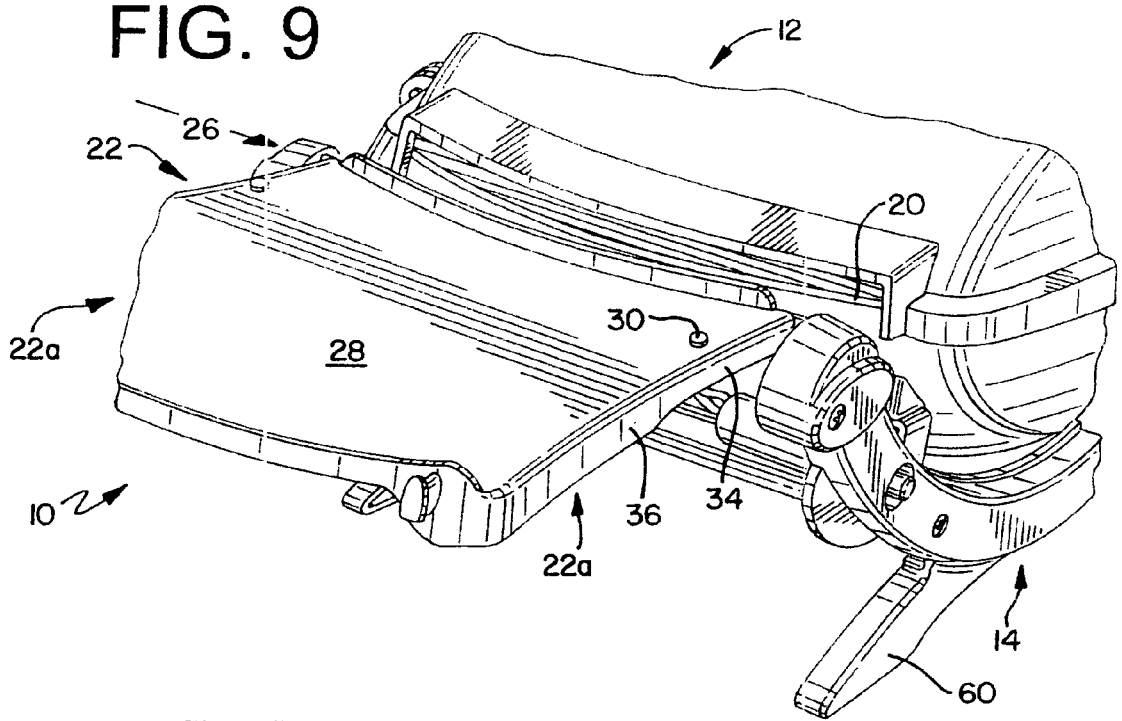
FIG. 9 is an elevated perspective view of a side of the grill shown in FIG. 3, showing the collapsible side shelf and frame assembly arrangement with the shelf in the use position and the cover in the closed position.

The heat shield 90 is secured in position on the frame by being supported on at least one lateral support surface 98 along an extent of the frame member (FIG. 10). In the preferred form of the invention, the lateral support surface 98 is comprised of a groove 100 formed in the first and second frame assemblies 60, 62. The grooves 100 cooperatively form a lateral slot along a lateral sliding path residing along a plane 102. The lateral slot is adapted to provide a path for the heat shield to pass into the space 64 between the frame assemblies 60, 62 to be inserted in place, with the bottom surfaces of the grooves 100 providing a sliding surface of edge areas 104 of the heat shield 90 (FIG. 9). At least one groove 100 further having a recess 106 with a lateral wall surface 107 adapted to prevent lateral movement of the shield 90 when the edge area 104 of the shield 90 is dropped from the lateral plane to a position on a lower plane 108 (FIG. 10). In this arrangement of structure, the shield 90 is inserted by the user between the frame members 60, 62 by insertion along the plane 102, and then lowered into plane 108 for the shield to be supported in the groove and prevented from lateral sliding removal by the wall surface 107.

The assembly 10 also includes an ignitor 110, used to ignite the burner element, which is preferably a gas burner such as is shown in the Figures, with a fuel source such as a fuel tank 112. The ignitor includes an ignitor actuator control 114 as a button or switch, which is secured to the frame assembly 14 to be mounted securely to the grill 10 and yet be exposed for the user to activate the ignitor distal end 116 which generates the spark or the like to ignite the gas from the burner for cooking. In the preferred form of the invention, the actuator 114 is located on one of the frame assemblies 60 and a portion of the actuator 114 passes through the frame assembly 60 to provide an exposed actuator button 118 on the frame 14 at a recess 120 in the frame 14.

A support bracket 122 is provided on the frame at the side of the firebox 18 for supporting the fuel tank 112. The support bracket 122 includes a loop having an inner perimeter that is cooperatively dimensioned to receive the outer perimeter of a standard and common size fuel tank 112. The fuel tank is thereby held in place on the grill assembly by the combination of the support bracket 122 at one part of the tank 112, and the tank being secured to the gas manifold 124 of the assembly 10. In the embodiment shown in FIG. 13, the support bracket 122 is mounted directly to the inside of a frame assembly 62, preferably the rear frame structure 14b. The mounting of the bracket 122 includes an attachment arm 126 that extends from the frame 14 to place the bracket perimeter in position for receiving the tank 112.

Referring now particularly to FIGS. 14 to 28, there is shown another embodiment of the cooking apparatus 10 of the present invention, which has a fire bowl 12. The fire bowl 12 has a bottom 14. Typically, the fire bowl 12 will be constructed of steel or iron. The bottom 14 assumes a smooth, arcuate shape so that the bottom 14 is basically concave relative to the internal chamber 16 of the fire bowl 12. The fire bowl 12 also includes a front 18 and a back 20. The sides of the front and back, 18 and 20 respectively, of the fire bowl 12 are slightly curved being convex from the exterior. The bottom 14 is also curved arcuately in the direction from front 18 to back 20. This forming of the fire bowl 12 is to maximize the reflecting or application of heat from the heating unit 22 that is contained within the internal chamber 16. Mounted at the upper end of the internal chamber 16 is a cooking grill 24. It is to be noted that the upper edge of the front 18 and back 20 are substantially flush to the upper edge of the left side 26 and the right side 28 of the fire bowl 12.

The bottom 14 of the fire bowl 12 is fixedly mounted onto a supporting frame 30. The supporting frame 30 includes a pair of parallel, spaced apart arcuate main members 32 and 34, which are in a bowl shape resembling a basic cradle configuration. Within that cradle is mounted the fire bowl 12. Extending between the members 32 and 34 are cross braces 36 and 38. The fire bowl 12 is fixedly mounted onto the cross braces 36 and 38 by mounts 40.

One end of the supporting frame 30 terminates in a handle 42 with the opposite end of the supporting frame 30 terminating in a handle 44. The handle 42 is located directly adjacent but slightly spaced from the left side 26. The handle 44 is located directly adjacent but slightly spaced from the right side 28.

The main member 32, as well as main member 34, is basically configured to be channeled shaped having an internal cavity 46. This cavity 46 is open at the bottom. A leg assembly composed of leg members 48 and 50 is to be mounted between the main members 32 and 34. The leg member 48 is pivotally mounted by pivot pins, 52 and 54 respectively, to the main members 32 and 34. The leg member 48 includes legs 56 and 58 with leg 56 being pivotally mounted by the pivot pin 52 to the main member 32 and leg member 58 being pivotally mounted by the pivot pin 54 to the main member 34. The outer end of the legs 56 and 58 has extending therebetween a cross member 60.

The leg member 50 includes a similar pair of legs with only leg 62 being shown. The leg 62 is pivotally mounted by a pivot pin 64 to the main member 32. Extending between the legs 62 and the not shown leg of the leg member 50 is a cross member 66.

The leg members 48 and 50 can be located in a retracted position relative to the supporting frame 30 which will locate the cross member 60 in conjunction with a notch 68 formed within the main member 32 and the cross member 66 engaging with a notch 70 formed within the main member 32. With the leg members 40 and 50 in this retracted position, the leg member 48 includes a pair of leg extensions 72 and 74 which are to be located on a supporting surface 76. It is to be noted that in this position the main members 32 and 34 will be located also very near the supporting surface 76, generally no more than a fraction of an inch therefrom. The leg member 50 also includes a similar pair of leg extensions with only leg extension 78 being shown.

When the leg member 48 is moved clockwise to an extended position, and the leg member 50 moved counterclockwise to an extended position, the leg member 78 moves within the internal cavity 46 of the main member number 32. When the leg extension 78 contacts the upper end of the internal cavity 46, this will define the limit of movement of the leg member 50 to the extended position. Such also is to occur for the leg member 48 with the leg extensions 72 and 74 as well as the not shown leg extension for leg member 50. It is to be noted when the leg members 48 and 50 are in the retracted position, the shape of the legs 56, 58, 62 and the not shown leg of leg member 50 will nest within the internal cavity 46 in a close conforming manner of the main members 32 and 34 respectively. It is to be noted that the leg members 40 and 50 will automatically remain in their retracted position until such is moved from the retracted position to the extended position. The extended position of the leg members 48 and 50 locates the outer end of the leg members 48 and 50 against the supporting surface 76.

Figure 18:
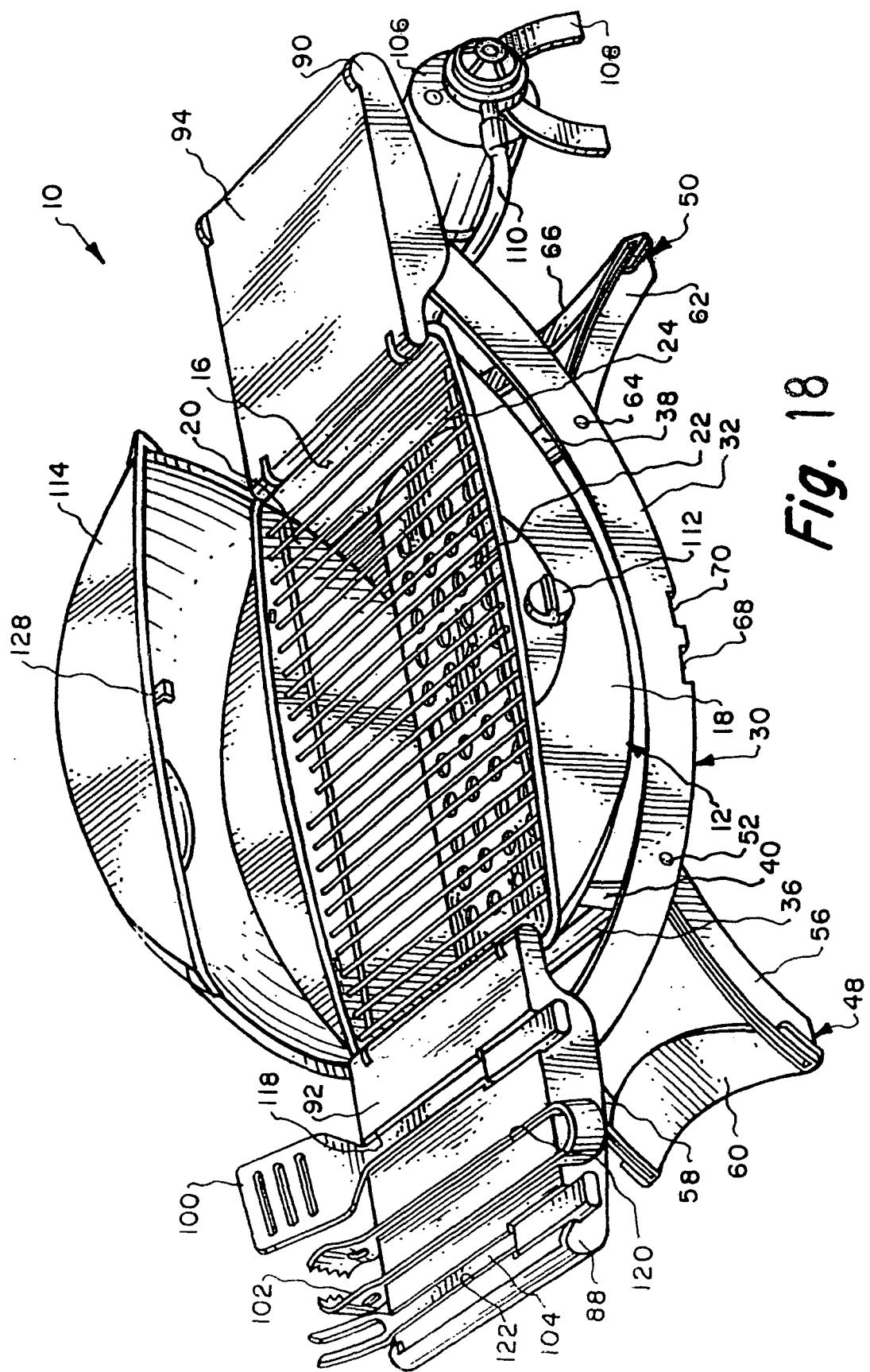
FIG. 18 is an isometric view of the cooking apparatus of this invention showing such in its typical usage position.
Figure 21:
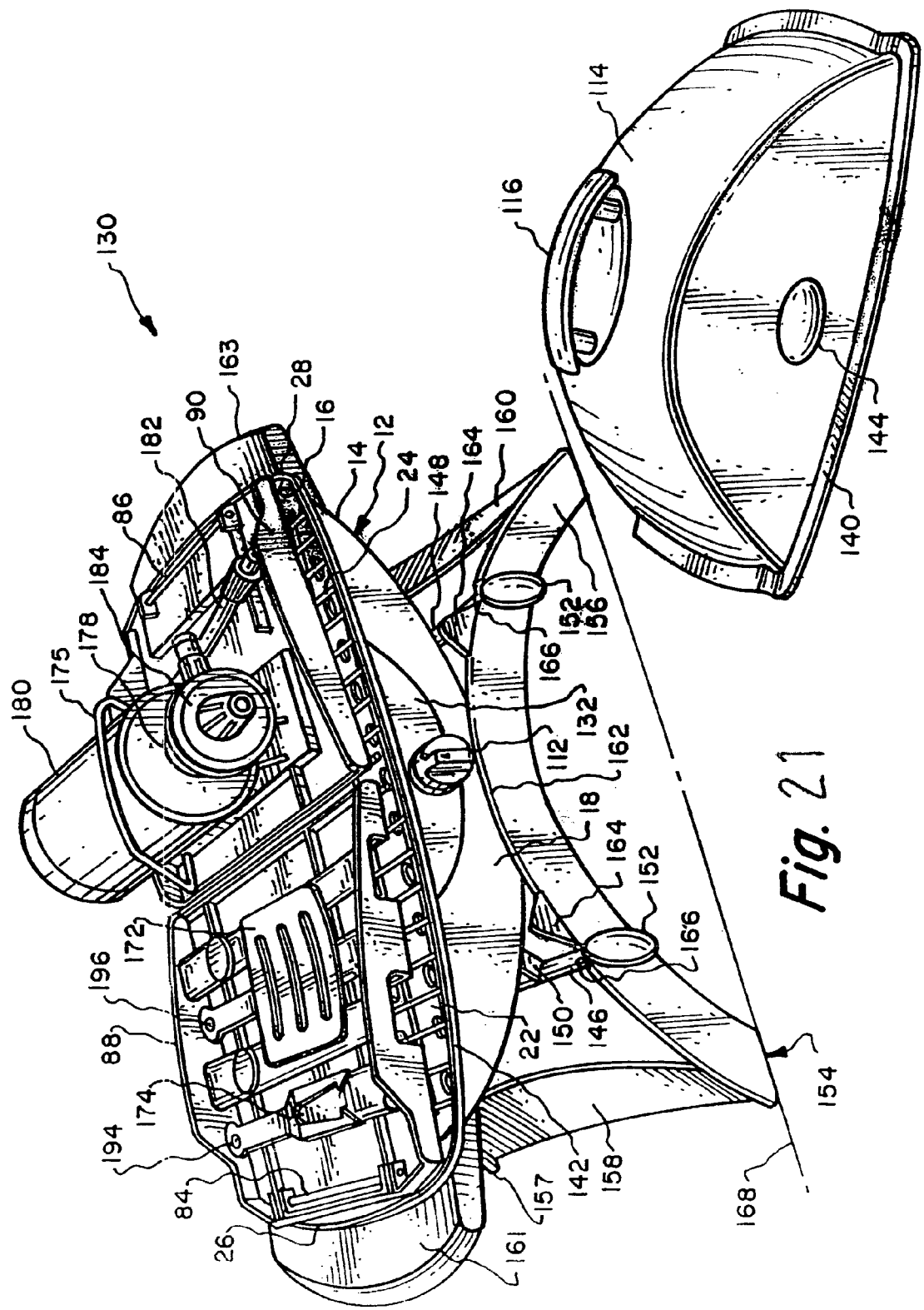
FIG. 21 is an isometric view of the cooking apparatus showing the lid removed and also showing the propane tank and utensils being mounted in a stowed position in conjunction with a pair of shelves that are also located in a stowage position on the grill of the cooking apparatus and with the leg assembly of the supporting frame being located in the extended (usage) position.
Figure 22:
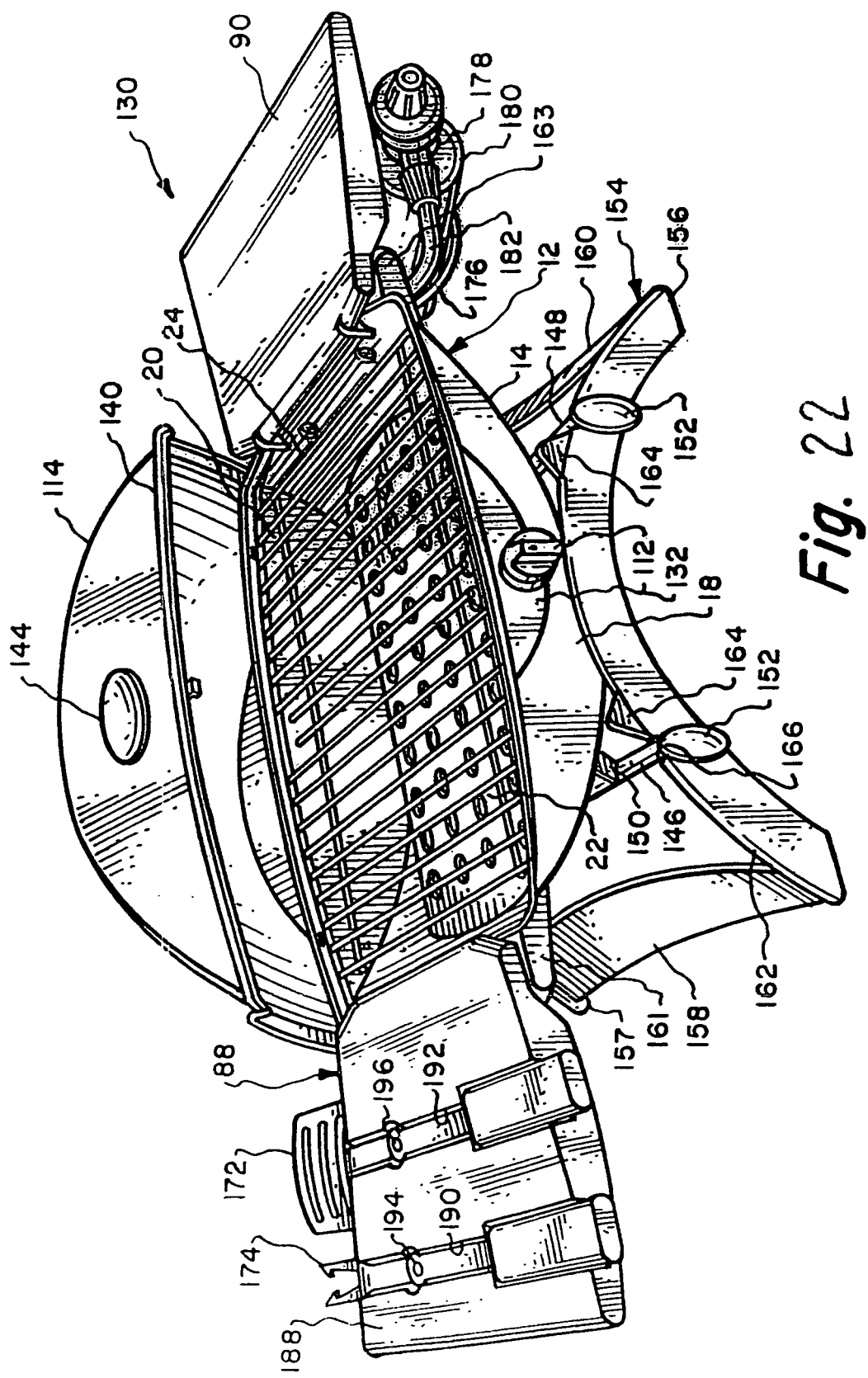
FIG. 22 is an isometric view of the cooking apparatus of this invention with the pair of shelves being moved to an outwardly extended position and the cooking apparatus in position for usage.
Figure 26:
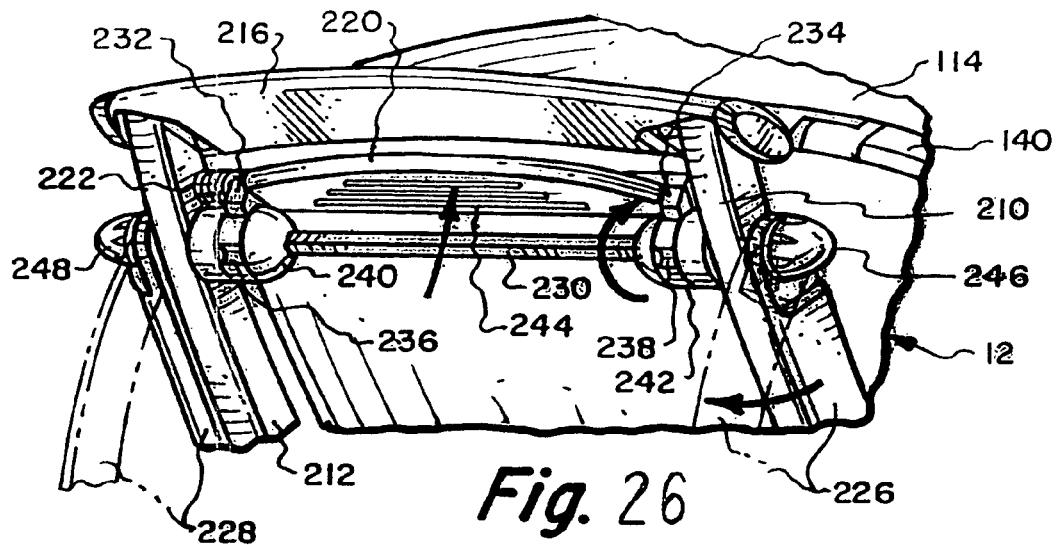
FIG. 26 is a cross-sectional view through the latching mechanism for the leg assembly of the cooking apparatus of this invention taken along line 13-13 of FIG. 24.
Figure 27:
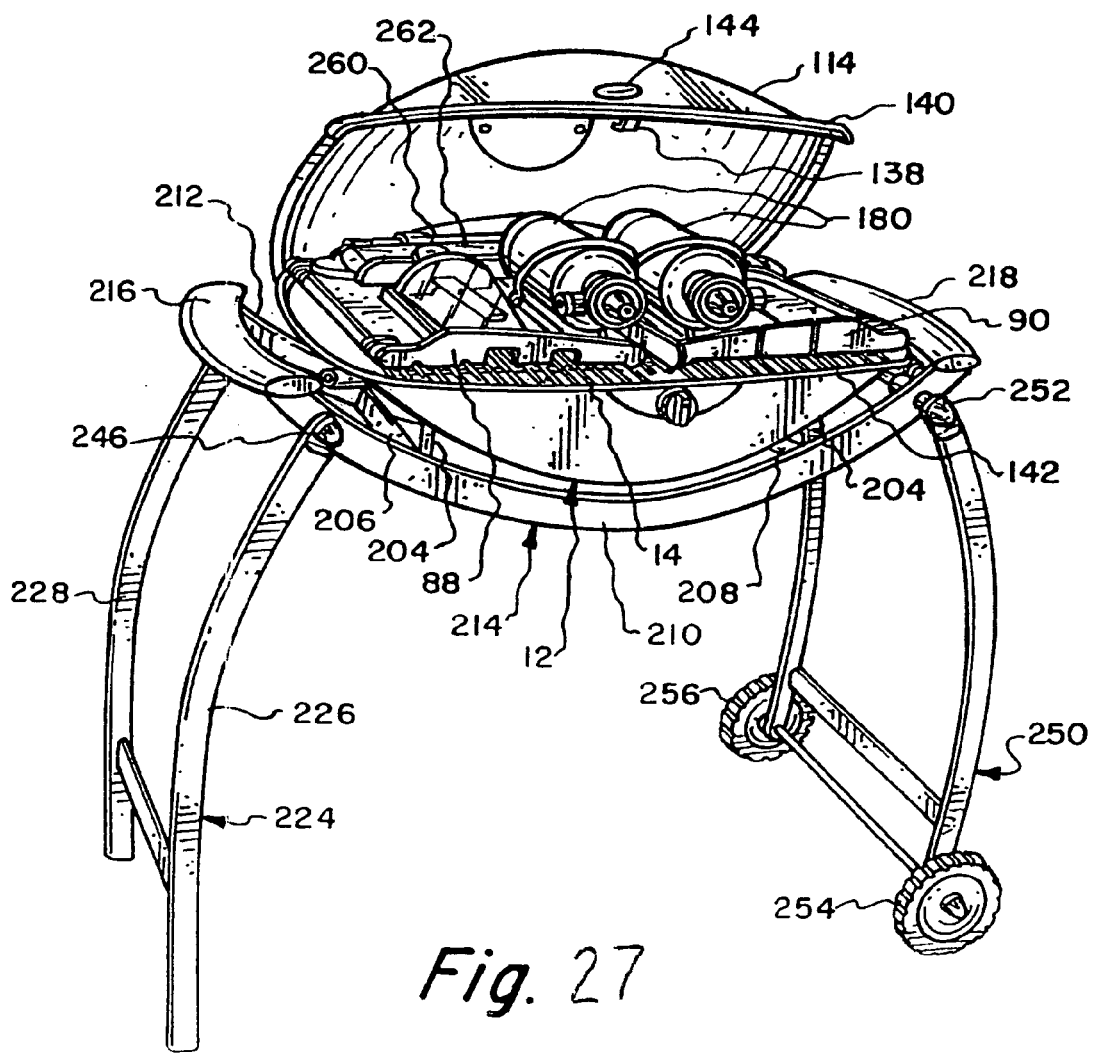
FIG. 27 is an isometric view of the cooking apparatus showing the lid in an open position and the leg assembly in the extended position, which is the normal position for usage of the cooking apparatus.

Fixedly mounted to the fire bowl 12 at the fore end 26 is a mounting bar 80. A similar mounting bar 82 is fixedly mounted to the fire bowl 12 at the aft end 28. Mounted on the mounting bar 80 is a pivot rod 84. A similar pivot rod 86 is pivotally mounted on the mounting bar 82. Connected to the pivot rod 84 is the inner end of a first shelf 88. The inner end of a second shelf 90 is connected to the pivot rod 86. The first shelf 88 is capable of being pivoted from a stowage position located within the confines of the internal chamber 16 shown in FIG. 17 of the drawings to an extended position, which is shown in FIG. 18 of the drawings. Similarly, the second shelf 90 is capable of being pivoted one hundred eighty degrees from the stowage position shown in FIG. 16 to an extended position shown in FIG. 18. In the stowage position shown in FIG. 16, the shelves 88 and 90 are located in juxtaposition and in alignment. In FIG. 18, the shelves 88 and 90 are no longer in juxtaposition but still in alignment. The shelf 88 has a planar working surface 92, and shelf 90 has a planar working surface 94. When the shelf 88 is in the extended position as shown in FIG. 18, the underside of the shelf 88 rests on the handle 42. Similarly, when the shelf 90 is in the extended position as shown in FIG. 18, the underside of the shelf 90 rests on the handle 44.

The bottom side of the shelves 88 and 90 is what are located in an upward facing direction when the shelves 88 and 90 are in the stowage position shown in FIG. 16. The undersurface of the shelves 88 and 90 includes a plurality of spaced-apart brace members 96 each of which includes notches 98. These notches 98 are to facilitate stowage of utensils, such as a spatula 100, tongs 102 and a fork 104. Also, there is provided sufficient space on the underside of the shelves 88 and 90 to accommodate a propane gas tank 106. The gas tank 106 can be removed and mounted on the supporting surface 76 in close proximity to the fire bowl 12. The forward end of the gas tank 106 is to be mounted in conjunction with a support 108, which is to rest on the supporting surface 76. It is necessary that the forward end of the gas tank 106 be at an elevated position to the rear end of the gas tank 106 in order for the gas tank 106 to supply gas properly through the conduit 110 to the heating unit 22. Control of the gas from the tank 106 to the heating unit 22 is by a regulator 184. Igniting of the gas within the heating unit 22 would normally be accomplished by use of an ignition device such as a conventional match, which is not shown.

The lid 114 is to be removed by unlatching of a latch mechanism (not shown) in FIGS. 14 to 18 by turning of knob 112 and grasping of handle 116 from its position totally enclosing of the internal chamber 16 and separating of the lid 114 completely from the fire bowl 12, as is shown in FIG. 16. Propane tank 106 is then to be removed and placed as shown in FIG. 18, and the conduit 110 is connected to an appropriate connection, which is not shown, mounted on the bottom 14 of the fire bowl 12. The spatula 100, tongs 102 and fork 104 are then removed and shelf 88 pivoted one hundred eighty degrees to rest on the handle 42, and shelf 90 then being pivoted one hundred eighty degrees to rest on the handle 44. The handle of the spatula 100 is to be located within the longitudinal groove 118 formed within the working surface 92 of the shelf 88. Similarly, the tongs 102 is to be mountable in conjunction with a pair of elongated grooves 120 formed within the working surface 92. Similarly, the handle of the fork 104 is to be locatable in longitudinal groove 122 formed within the working surface 92. The depths of the grooves 118, 120 and 122 are such that the spatula 100, tongs 102 and fork 104 are located below the working surface 92 so that the working surface 92 is capable of being used by locating of a plate or other object thereon during performing of cooking on grill 24 even when the utensils are still mounted with the shelf 88. However, by using the longitudinal grooves 118, 120 and 122, the spatula 100, the tongs 102 and the fork 104 are ready at hand available for usage.

The lid 114 is connectable to the fire bowl 12 which is discussed in relation to the third embodiment of this invention which follows in the specification that permits the lid 114 to move to a tilted position, shown in FIG. 18, which provides access into the grill 24 without having the lid 114 separated completely from fire bowl 12. This position of the lid 114, which is shown in FIG. 18, would be common during cooking of food on the grill 24. The lid 114 includes a latching pawl 128, which is to engage with the side 18 in order to lock in position the lid 114 when it is in the completely closed position, which is shown in FIG. 14.

It is to be understood that the initial position of the grill will normally be that of FIG. 14. The operator will first put the leg members 48 and 50 to the extended position and then remove the lid 114 from the fire bowl 12. The propane tank 106 and the utensils 100, 102 and 104 are removed from the back side of the shelves 88 and 90. The shelves 88 and 90 are then moved to the extended position, which is shown in FIG. 18. The spatula 100 is located in conjunction with the longitudinal groove 118, the tongs 102 is located in conjunction with the longitudinal groove 120 and the fork 104 is located in conjunction with the longitudinal groove 122. The lid 114 can then be located in the tilted position in conjunction with side extensions 124 and 126. Turning of the knob 112 will initiate the supplying of the gas through conduit 110 to the heating unit 22 and upon ignition of the gas of the heating unit 22, the cooking apparatus 10 of this invention is now ready for usage. After usage, the procedure is reversed to place the cooking apparatus 10 back in the position shown in FIG. 14, which would mean that the cooking apparatus 10 is in a position for transportation and storage.

Referring particularly to FIGS. 19 to 22, there is shown another further embodiment 130 of cooking apparatus of this invention. The embodiment 130 includes a fire bowl 12, which has a bottom 14, an internal chamber 16 and sides 18 and 20. Mounted within the internal chamber 16 is the heating unit 22 and grill 25. The fire bowl 26 also has a fore end 26 and an aft end 28. Turning of knob 112 causes knob 112 to pivot relative to block 132 mounted on the exterior surface of the side 18. The knob 112 has fixedly connected thereto a rod 134. Rod 134 extends through a hole formed in the side 18 and is fixed to hook 136. Hook 136 can be pivoted into engagement with retainer 138. Retainer 138 is fixedly mounted on the inside surface of the lid 114. When the control knob 112 is turned counterclockwise to the maximum, the hook 136 will engage with the retainer 138, as is shown in FIG. 20 of the drawings. Movement of the control knob 112 ninety degrees in a counterclockwise direction will cause the hook 136 to become disengaged from the retainer 138 which will permit the lid 114 to be pivoted to an almost ninety degree tilted position, which is clearly shown in FIG. 22 of the drawings. The lid 114 has a peripheral depending lip 140, which is to overhangingly connect with in a close conforming manner an upstanding free edge 142 of the fire bowl 12. Mounted on the exterior surface of the lid 114 there may be included a manufacturing identifying emblem 144.

Fixedly mounted to the exterior surface of the bottom 14 is a pair of parallel spaced apart cross braces 146 and 148. The cross braces 146 and 148 are fixedly mounted to the bottom 14 by means of short rods 150. The outer end of each cross brace 146 and 148 has an enlarged head 152. The cross braces 146 and 148 are located transverse to the sides 18 and 20.

An arcuately shaped supporting stand 154 has a pair of parallel oriented spaced apart curved main members 156 and 157. Connecting between the main members 156 and 157 adjacent their ends thereof are connecting braces 158 and 160. Within the convex edge 162 of the main member 156 are mounted a pair of spaced apart protruding feet 164. Also formed within the convex edge 162 is a pair of slots 166. Cross brace 146 is to connect with a pair of the slots 166 with one slot 166 being in main member 156 and the other slot 166 being in the main member 157 that is parallel to and spaced from main member 156. Similarly, cross brace 148 is to be connectable with a similar pair of aligned slots 166. The connection of the cross braces 146 and 148 within the respective slots 166 is in a snug manner so that the support stand 154 will be held in position in conjunction with the cross braces 146 and 148. When the cross braces 146 and 148 are located within the slots 166, the support stand 154 is mounted so as to space the fire bowl 12 some distance away from the supporting surface with it being understood that the outer ends of the main members, such as main member 156, are resting on the supporting surface 168.

Each of the main members 156 and 157 have formed on their inside surface a pair of slots 170 which are similar to slots 166. Each cross brace 146 and 148 can snugly connect with an aligned set of slots 170 which will locate the support stand 154 in the position shown within FIG. 19 of the drawings. This is the stowage position of the support stand 154, which is to be utilized when the second embodiment 130 is not being operated.

Pivotally mounted to the fore end 26 is a first shelf 88 with a second shelf 90 being pivotally mounted to the aft end 28. This pivot mounting is obtained by using pivot rods 84 and 86 respectively. The shelves 88 and 90 can be pivoted to an outward extending position with first shelf 88 resting on handle 161 and shelf 90 resting on handle 163. The handles 161 and 163 are also to function to physically pick up and transport the second embodiment 186 of cooking apparatus. The inside surface of the first shelf 88 includes a series of recesses which facilitate stowage of utensils, such as the spatula 172 and the fork 174. Mounted on the undersurface of the shelf 90 is a wire holder in the form of a pair of wire hangers 176 and 178. The wire hangers 176 and 178 connect with the propane tank 180. When the shelf 90 is pivoted one hundred eighty degrees from the position shown in FIG. 21 to the position shown in FIG. 22, which is the extended position of the shelf 90, propane tank 180 will be held in position against the under surface of the shelf 90 but permitted to be located at approximately a thirty degree inclined angle. This inclination is necessary in order for the propane to move the flow in a desirable manner through the connecting hose 182 to the burner unit, which is not shown. It is to be noted that the second embodiment 130 is of a smaller configuration than the first embodiment 10. Because of this, it was necessary to fold in half the utensils composing of the spatulas 172 and 174 so as to cut down the length of such in order to achieve stowage against the under surface of the shelf 88. The shelf 88 in FIG. 22 has within its working surface 188, which is the upper surface, a pair of elongated grooves 190 and 192. When the fork 174 is pivoted about its pivot joint 194 from the collapsed position to the expanded position, it then can be mounted within the groove 190 so that the fork 174 is located totally beneath the working surface and does not interfere with the utilization of the working surface 188. The same is true for the spatula 172 if it is pivoted from its collapsed position about pivot joint 196 to the expanded position and inserted within the groove 192.

Referring particularly to FIGS. 23 to 28 of the drawings, there is shown another further embodiment 186 of cooking apparatus of this invention. This embodiment 186 is to be the largest of the embodiments, and because of its size, it is not easily as portable as embodiment 10 and embodiment 130. The fire bowl 12 of the third embodiment 186 is substantially larger in size. The backside of the lid 114 includes a pair of spaced apart protuberances 198 and 200. Each protuberance 198 and 200 is to connect with a hole formed within the fire bowl 12 with only hole 202 being shown. The holes, such as hole 202, are formed within the free edge 142 of the fire bowl 12. The connection arrangement between the protuberances 98 and the holes 202 is such that it will permit the lid 114 to pivot to an upward position and be supported in that position with the lid 114 assuming a tilted position.

Fixedly mounted to the bottom 14 of the fire bowl 12 are four in number of short rods 204. Two of the short rods 204 are fixed to cross brace 206 with the remaining two in number of short rods 204 being fixed to the cross brace 208. The cross braces 206 and 208 are fixed between a pair of main members 210 and 212 of the supporting frame 214. The left end of the supporting frame 214 terminates in a handle 216 with the right end of the supporting frame 214 terminating in a handle 218. Mounted underneath each handle 216 and 218 is a latch plate with only latch plate 220 being shown for handle 216. The latch plate 220 is forced by a coil spring 222 to an at-rest position. This at-rest position will lock the leg assembly 224 in its upper position, which is shown in FIG. 23 of the drawings. Connected between the leg members 226 and 228 of the leg assembly 224 is a rod 230. The latch plate 220 has a pair of pawls 232 and 234 located at opposite ends of the plate 220. The pawls 232 and 234 are to engage respectively with recesses 236 and 238, which are formed respectively within spools 240 and 242, which are fixedly mounted onto the rod 230. When the latch plate 220 is lifted in the direction of arrow 244, the pawls 232 and 234 are removed from their respective recesses 236 and 238, which will permit the leg assembly 224 to be pivoted to the outwardly extending position shown in FIG. 27. In this outwardly extending position, knob 236 can be manually tightened so as to fix in position the leg assembly 224 in this outwardly extended position. In a similar manner, knob 238 can be tightened which will further fix in position the leg assembly 224 in this outwardly extended position.

In a similar manner, a latch plate, which is mounted under the handle 218 is to be moved in the same way in order to permit the leg assembly 250 to be pivoted to an outwardly extended position. Again, knobs 252 are to be tightened which will secure in position the leg assembly 250 in this outward extended position. The leg assembly 250 is to include wheels 254 and 256. The wheels 254 and 256 facilitate low frictional rolling movement of the third embodiment 186 of this invention by lifting on handle 216 and then rolling of the third embodiment 186 on the wheels 254 and 256. It is to be noted that the leg assembly 250 assumes a crossed position relative to the leg assembly 224 when in the upper or retracted position shown in FIG. 23. The leg assembly 250 is essentially parallel to the leg assembly 224 when in the outwardly extended or usage position shown in FIG. 27.

Mounted on the grill 24 is a pair of shelves 88 and 90. The only difference is that because of the size of the fire bowl 12, there will be normally included two separate burners within the internal chamber of the fire bowl 12. Therefore, each burner has to have its own separate butane tank with their being two butane tanks 180 hung by wire hangers 176 and 178 with there being a separate butane tank 258 located under each shelf 88 and 90.

Along with the utensils 260 and 262, which can be mounted in a stowage position between the shelves 88 and 90 when such are mounted on the grill 24, there also may be included a basting container 262. This basting container 262 can be disengaged from the backside of shelf 88 and mounted on the shelf 90, as is shown in FIG. 28. The utensils 260 and 262, which comprise a spatula and fork respectively, can also include tongs 264. When the shelves 88 and 90 are in an outwardly extended position with shelf 88 being supported on the handle 216 and shelf 90 being supported on the handle 218, the spatula 260, the fork 262 and the tongs 264 can be mounted within grooves 266 formed in the upper surface of shelf 88. Again, the mounting of the spatula 260, fork 262 and tongs 264 are such that it is located beneath the working surface of the shelf 88.

While the specific embodiments have been illustrated and described, numerous modifications come to mind without significantly departing from the spirit of the invention and the scope of protection is only limited by the scope of the accompanying claims.

What is claimed is:

1. A portable barbecue grill assembly comprising:
   a fire bowl having a topside opening;
   at least one handle attached to said fire bowl; and
   at least one shelf being directly and pivotally attached to said handle, said shelf being foldable inwardly towards said topside opening of said fire bowl during a stowage position and extendable outwardly away from said topside opening of said fire bowl during a usage position.

2. The assembly of claim 1 wherein said handle is directly attached to said fire bowl.

3. The assembly of claim 1 wherein at least a portion of said shelf is situated above at least a portion of said topside opening of said fire bowl during said stowage position.

4. The assembly of claim 1 further comprising a grill, at least a portion of said shelf is generally parallel to said grill during said stowage position.

5. The assembly of claim 1 further comprising a base, said fire bowl being mounted on said base.

6. The assembly of claim 1 wherein said fire bowl comprises opposing ends, said first handle being attached to said first end of said fire bowl.

7. The assembly of claim 6 further comprising a second handle, said handle being attached to said second opposing side of said fire bowl.

8. The assembly of claim 7 wherein said second handle is directly attached to said fire bowl.

9. The assembly of claim 7 further comprising a second shelf, said shelf being pivotally attached to said handle, said shelf being foldable inwardly towards said topside opening of said fire bowl during a stowage position and extendable outwardly away from said topside opening of said fire bowl during a usage position.

10. The assembly of claim 9 wherein said second shelf is directly and pivotally attached to said second handle.

11. The assembly of claim 1 further comprising at least one lid.

12. The assembly of claim 11 wherein said lid is pivotally attached to said fire bowl.

13. The assembly of claim 12 wherein said lid is directly and pivotally attached to said fire bowl.

14. The assembly of claim 1 wherein said shelf is suspended over said topside opening of said fire bowl during said stowage position.

15. The assembly of claim 1 wherein said shelf is situated within said fire bowl during said stowage position.

16. A portable barbecue assembly comprising:
   a cooking chamber comprising a fire bowl and a topside opening, said fire bowl having opposing sides;
   at least two handles, each handle being attached to said opposing sides of said fire bowl; and
   at least two shelves, each shelf being pivotally and directly attached to each of said handles, said shelves being foldable inwardly towards said topside opening of said cooking chamber during a stowage position and extendable outwardly away from said topside opening of said cooking chamber during a usage position.

17. The assembly of claim 16 wherein said handles are directly attached to each of said opposing ends of said fire bowl.

18. The assembly of claim 16 wherein at least a portion of each of said shelves is situated above at least a portion of said topside opening of said cooking chamber during said stowage position.

19. The assembly of claim 16 further comprising a grill, at least a portion of each of said shelves is generally parallel to said grill during said stowage position.

20. The assembly of claim 16 further comprising a base, said fire bowl being mounted on said base.

21. The assembly of claim 16 further comprising a grill, at least a portion of said grill is situated within said fire bowl.

22. The assembly of claim 16 further comprising at least one lid.

23. The assembly of claim 22 wherein said lid is pivotally attached to said fire bowl.

24. The assembly of claim 23 wherein said lid is directly and pivotally attached to said fire bowl.

25. The assembly of claim 16 wherein each of said shelves is suspended over said topside opening of said fire bowl during said stowage position.

26. The assembly of claim 16 wherein each of said shelves is situated within said fire bowl during said stowage position.

27. A cooking apparatus comprising:
   a fire bowl comprising a topside opening;
   a lid, said lid being pivotally attached to said fire bowl;
   at least one handle attached to said fire bowl; at least one grill situated with said topside opening of said fire bowl; and
   at least one shelf being directly and pivotally attached to said handle, said shelf being foldable inwardly towards said topside opening of said fire bowl during a stowage position and extendable outwardly away from said topside opening of said fire bowl during a usage position, said shelf being situated above said grill during said stowage position.

28. The apparatus of claim 27 wherein said handle is directly attached to said fire bowl.

\* \* \* \* \*